(12) United States Patent
Cullick et al.

(10) Patent No.: US 7,835,893 B2
(45) Date of Patent: Nov. 16, 2010

(54) METHOD AND SYSTEM FOR SCENARIO AND CASE DECISION MANAGEMENT

(75) Inventors: Alvin Stanley Cullick, Austin, TX (US); Keshav Narayanan, Austin, TX (US); Glenn E. Wilson, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 644 days.

(21) Appl. No.: 10/653,829

(22) Filed: Sep. 3, 2003

(65) Prior Publication Data

US 2004/0220790 A1 Nov. 4, 2004

Related U.S. Application Data

(60) Provisional application No. 60/466,621, filed on Apr. 30, 2003.

(51) Int. Cl.
*G06G 7/48* (2006.01)

(52) U.S. Cl. .............................. 703/6; 166/60; 166/380; 166/302; 166/300; 166/263

(58) Field of Classification Search .................. 175/45; 703/10, 2, 6, 15; 701/200; 345/419; 705/1; 166/302, 256, 245; 707/100, 103 R; 702/14, 702/12, 13, 16; 367/73

See application file for complete search history.

(56) References Cited

U.S. PATENT DOCUMENTS 5,103,920 A * 4/1992 Patton ......................... 175/45

(Continued)

FOREIGN PATENT DOCUMENTS

WO WO 00/48022 8/2000

(Continued)

OTHER PUBLICATIONS

Sameer Joshi, William E. Brigham, Louis Castanier Techno—Economic and Risk Evaluation of a Thermal Recovery Project Work Performed Under Contract DE-FG22-93BC14899, Mar. 1996 Prepared for Department of Energy Assistant Secretary for Fossil Energy.*

(Continued)

*Primary Examiner*—Kamini S Shah
*Assistant Examiner*—Cuong V Luu
(74) *Attorney, Agent, or Firm*—Meyertons Hood Kivlin Kowert & Goetzel, P.C.; Jeffrey C. Hood; Mark K. Brightwell

(57) ABSTRACT

A system and method may be configured to support the evaluation of the economic impact of uncertainties associated with the planning of a petroleum production project, e.g., uncertainties associated with decisions having multiple possible outcomes and uncertainties associated with uncontrollable parameters such as rock properties, oil prices, etc. The system and method involve receiving user input characterizing the uncertainty of planning variables and performing an iterative simulation that computes the economic return for various possible instantiations of the set of planning variables based on the uncertainty characterization. The system and method may (a) utilize and integrate highly rigorous physical reservoir, well, production flow, and economic models, and (b) provide a mechanism for specifying constraints on the planning variables. Furthermore, the system and method may provide a case manager process for managing multiple cases and associated "experimental runs" on the cases.

27 Claims, 13 Drawing Sheets

U.S. PATENT DOCUMENTS

| | | | | |
|---|---|---|---|---|
| 5,838,634 | A * | 11/1998 | Jones et al. | 367/73 |
| 5,980,096 | A * | 11/1999 | Thalhammer-Reyero | 707/100 |
| 5,992,519 | A * | 11/1999 | Ramakrishnan et al. | 166/250.15 |
| 6,106,561 | A * | 8/2000 | Farmer | 703/10 |
| 6,236,894 | B1 | 5/2001 | Stoisits et al. | |
| 6,266,619 | B1 * | 7/2001 | Thomas et al. | 702/13 |
| 6,356,844 | B2 * | 3/2002 | Thomas et al. | 702/12 |
| 6,549,854 | B1 | 4/2003 | Malinverno et al. | |
| 6,715,551 | B2 * | 4/2004 | Curtis et al. | 166/250.16 |
| 6,735,596 | B2 | 5/2004 | Corynen | |
| 6,810,332 | B2 | 10/2004 | Harrison | |
| 6,853,921 | B2 * | 2/2005 | Thomas et al. | 702/14 |
| 6,980,940 | B1 * | 12/2005 | Gurpinar et al. | 703/10 |
| 7,010,558 | B2 * | 3/2006 | Morris | 708/409 |
| 7,047,171 | B1 * | 5/2006 | Sproch | 703/12 |
| 7,096,172 | B2 * | 8/2006 | Colvin et al. | 703/10 |
| 7,130,761 | B2 | 10/2006 | Hall et al. | |
| 7,277,836 | B2 * | 10/2007 | Netemeyer et al. | 703/6 |
| 7,349,838 | B2 | 3/2008 | Summers | |
| 7,379,890 | B2 | 5/2008 | Myr et al. | |
| 7,389,209 | B2 | 6/2008 | Masiello et al. | |
| 7,467,045 | B2 | 12/2008 | Tabanou et al. | |
| 7,474,995 | B2 | 1/2009 | Masiello et al. | |
| 2001/0042642 | A1 | 11/2001 | King | |
| 2002/0013687 | A1 * | 1/2002 | Ortoleva | 703/10 |
| 2002/0016679 | A1 * | 2/2002 | Thomas et al. | 702/14 |
| 2002/0053430 | A1 * | 5/2002 | Curtis et al. | 166/250.01 |
| 2002/0067373 | A1 * | 6/2002 | Roe et al. | 345/762 |
| 2002/0099505 | A1 * | 7/2002 | Thomas et al. | 702/12 |
| 2002/0100584 | A1 | 8/2002 | Couet et al. | |
| 2002/0120429 | A1 * | 8/2002 | Ortoleva | 703/2 |
| 2002/0169589 | A1 * | 11/2002 | Banki et al. | 703/15 |
| 2002/0169785 | A1 * | 11/2002 | Netemeyer et al. | 707/103 R |
| 2002/0177955 | A1 * | 11/2002 | Jalali et al. | 702/9 |
| 2003/0033184 | A1 * | 2/2003 | Benbassat et al. | 705/8 |
| 2003/0149571 | A1 | 8/2003 | Francesco et al. | |
| 2003/0204434 | A1 | 10/2003 | Linton et al. | |
| 2003/0205378 | A1 * | 11/2003 | Wellington et al. | 166/302 |
| 2003/0209348 | A1 * | 11/2003 | Ward et al. | 166/256 |
| 2003/0220775 | A1 * | 11/2003 | Jourdan et al. | 703/2 |
| 2004/0020642 | A1 * | 2/2004 | Vinegar et al. | 166/245 |
| 2004/0034465 | A1 * | 2/2004 | Spiesberger | 701/200 |
| 2004/0039622 | A1 | 2/2004 | Masiello et al. | |
| 2004/0122640 | A1 * | 6/2004 | Dusterhoft | 703/10 |
| 2004/0174357 | A1 * | 9/2004 | Cheung et al. | 345/419 |
| 2004/0181422 | A1 * | 9/2004 | Brand | 705/1 |
| 2004/0220790 | A1 | 11/2004 | Cullick et al. | |
| 2004/0220846 | A1 | 11/2004 | Cullick et al. | |
| 2004/0236709 | A1 | 11/2004 | Johnson et al. | |
| 2005/0004833 | A1 | 1/2005 | McRae et al. | |
| 2005/0015231 | A1 * | 1/2005 | Edwards et al. | 703/10 |
| 2005/0149307 | A1 | 7/2005 | Gurpinar et al. | |

FOREIGN PATENT DOCUMENTS

| | | |
|---|---|---|
| WO | WO 01/62603 | 8/2001 |

OTHER PUBLICATIONS

Alexaner Egyed A Scenario-Driven Approach to Traceability 0-7695-1050-7/01, IEEE 2001.*

Sheldon Gorell, Robert Bassett Trends in Reservoir Simulation: Big Models Scalable Models? Will you Please Make up Your Mind?, SPE 71596, SPE Annual Technical Conference and Exhibition Sep. 2001 SPE Annual Conference and Exhibition.*

"TERAS Evaluation Module User Guide", Landmark Graphics Corporation, 2000, Part No. 157607 R98.7, 215 pages.

Floris et al., "Integrated Scenario and Probabilistic Analysis for Asset Decision Support" Petroleum Geoscience, vol. 8 2002, pp. 1-6.

Owen, Art, B., "Controlling Correlations in Latin Hypercube Samples", Journal of the American Statistical Association, Dec. 1994, vol. 89, No. 428, pp. 1517-1522.

Stein, Michael, "Large Sample Properties of Simulation Using Latin Hypercube Sampling", Technometrics, May 1987, vol. 29, No. 2, pp. 143-151.

Begg, et al., "Improving Investment Deicision Using a Stochastic Integrated Asset Model", Landmark Graphics Corporation, and J.M. Campbell, International Risk Management, SPE71414 16 pages.

Pallister, I & D. Pointing: "Asset Optimization Using Multiple Realizations and Streamline Simulation" Apr. 25, 2000, SPE 59460, XP-002261290.

Fassihi et al., "Risk Management for the Development of an Onshore Prospect" Mar. 20, 1999, SPE 52975, XP-02261289.

Reynolds, W., "Economic Analysis of Drilling Plans and Contractors by Use of Drilling Systems Approach" Journal of Petroleum Technology, Jul. 1986, pp. 787-793, XP-002261288.

Narayanan, et al., "Better Field Development Decisions from Multiscenario, Interdependent Reservoir, well, and Facility Simulations" Feb. 2003, SPE 79703.

International Search Report and Written Opinion, International Appln. No. PCT/US2004/013371, mailed Sep. 22, 2004.

U.S. Appl. No. 60/183,836, entitled "Method for monitoring and controlling drainage of a petroleum reservoir", by Vidya Verma, filed Feb. 22, 2000.

Yarus, J.M., K. Yang, and K. Kramer; "Practical Workflows for Reservoir Modelling"; Geostatistical Rio 2000: Proceedings of the Geostatistics Sessions of the 31st International Geological Congress, Rio de Janeiro, Brazil, Aug. 6-17, 2000, p. 69-84.

* cited by examiner

| Fast Track - Pre-Production Schedule Manager | | | | | | | |
|---|---|---|---|---|---|---|---|
| Schedule # | Name | Estimated Start | Start Dependency | Estimated End | Estimated Production Start | Production Start Dependency | # Facilities | # Wells | Notes |
| 1 | Tamco Workgroup | 27 Oct 03 | | 19 Jul 04 | 28 August 04 | | 1 | 6 | Probable? |

View/Edit...    Delete    Close    Help...

METHOD AND SYSTEM FOR SCENARIO AND CASE DECISION MANAGEMENT

CONTINUATION DATA

This application claims the benefit of priority of U.S. Provisional Application No. 60/466,621, filed on Apr. 30, 2003, entitled "Method and System for Scenario and Case Decision Management", invented by Cullick, Narayanan and Wilson, which is hereby incorporated by reference in its entirety as though fully and complete set forth herein.

BACKGROUND OF THE INVENTION

1. Field of the Invention

This invention relates generally to the field of petroleum reservoir exploitation, and more particularly, to a system and method for evaluating decision alternatives for a producing prospect or field.

2. Description of the Related Art

A petroleum production system may include a petroleum reservoir, a set of wells connected to the reservoir (or a set of reservoirs), and a set of facilities connected to the wells. The set of wells includes one or more production wells, and optionally, one or more injection wells. Each well has an associated path through space that extends from an initial location on the surface of the earth (or ocean) to a target location in the reservoir. The trajectory of (i.e., the locus of points that reside on) this path is referred to herein as the well plan. Each well may be perforated at one or more locations on its well plan to increase the connectivity of the well into the reservoir.

The output of the petroleum production system depends on its inputs, initial conditions, and operating constraints. The output of the petroleum production system may be described in terms of production profiles of oil, gas and water for each of the production wells. Initial conditions on the reservoir may include initial saturations and pressures of oil, gas and water. Inputs may include profiles of fluid (e.g., water or gas) injection at the injection wells, and profiles of pumping effort exerted at the production wells. Operating constraints may include constraints on the maximum production rates of oil, gas and water per well (or per facility). The maximum production rates may vary as a function of time. Operating constraints may also include maximum and/or minimum pressures at the wells or facilities.

The establishment of the wells and facilities of the petroleum production system involves a series of capital investments. The establishment of a well may involve investments to drill, perforate and complete the well. The establishment of a facility may involve a collection of processes such as engineering design, detailed design, construction, transportation, installation, conformance testing, etc. Thus, each facility has a capital investment profile that is determined in part by the time duration and complexity of the various establishment processes.

A commercial entity operating the petroleum production system may sell the oil and gas liberated from the reservoir to generate a revenue stream. The revenue stream depends on the total production rates of oil and gas from the reservoir and the market prices of oil and gas respectively. The commercial entity may operate its assets (e.g., wells and facilities) under a set of fiscal regimes that determine tax rates, royalty rates, profit-sharing percentages, ownership percentages (e.g., equity interests), etc. Examples of fiscal regimes include production sharing contracts, joint venture agreements, and government tax regimes.

A person planning a petroleum production enterprise with respect to a set of reservoirs may use a reservoir simulator (such as the VIP simulator produced by Landmark Graphics Corporation) to predict the oil, gas and water production profiles of a petroleum production system. The reservoir simulator may be supplied with descriptions of the system components (reservoirs, wells, facilities and their structure of inter-connectivity) and descriptions of the system inputs, initial conditions and operating constraints.

Furthermore, said person may use an economic computation engine (e.g., an economic computation engine implemented in Excel or a similar spreadsheet application) to compute return as a function of time and/or net present value. The economic computation engine may be supplied with: (a) a schedule specifying dates and costs associated with the establishment of each facility, and dates and costs associated with the establishment of each well (especially, production start dates associated with each well); (b) fiscal input data (such as inflation rates, tax rates, royalty rates, oil and gas prices over time, operating expenses); and (c) the production profiles of oil, gas and water predicted by the reservoir simulator.

The problem with this planning approach is that many of the input parameters supplied to the reservoir simulator and the economic computation engine are uncertain. It is difficult to know precisely the rock porosity field, or initial saturations of oil, gas and water in the reservoir. It is perhaps impossible to know exactly how long it will take or how much it will cost to drill, perforate and complete each well, or to establish each facility. Oil and gas prices are difficult to predict as are tax rates. Thus, a single run of the reservoir simulator and economic computation engine gives said person no idea of how the uncertainty in the input parameters is likely to affect his/her return on investment or net present profit value.

Each input parameter may be categorized as either a controllable parameter or an uncontrollable parameter. Controllable parameters are parameters subject to the control of the designer, constructor or operator of the petroleum production system. Controllable parameters include parameters such as the number of wells, the number of facilities, the size of facilities, the locations of wells, and the well plans. Uncontrollable parameters are parameters that are not subject to the control of the designer, constructor or operator of the petroleum production system. Uncontrollable parameters include parameters such as oil and gas prices, rock permeability and initial saturations of oil and gas. Said person planning the petroleum production enterprise is faced with the daunting task of selecting values for the controllable parameters that will maximize average profit and minimize uncertainty in profit in view of the uncertainty in each of the uncontrollable parameters. Thus, there exists a need for a computational system and method capable of improving this selection process and capable of providing the enterprise planner with better information as to the effects of parameter uncertainties on economic returns.

SUMMARY

In one set of embodiments, a computational system and method may be configured to provide support for the evaluation of the economic impact of uncertainties associated with a petroleum production project, e.g., uncertainties associated with controllable parameters and uncontrollable parameters. The computational method may include:

(a) receiving user input characterizing probability distributions for planning variables associated with a set of models;

(b) generating instantiated values of the planning variables;

(c) assembling one or more input data sets for one or more simulation engines from the set of models and the instantiated values;

(d) executing the one or more simulation engines on one or more input data sets;

(e) storing the instantiated values of the planning variables and data output from the one or more simulation engines to a storage medium.

Furthermore, operations (b), (c), (d) and (e) may be performed a number of times until a termination condition is achieved. Steps (b), (c), (d) and (e) are collectively referred to as the "iteration loop".

In some embodiments, the storing step (e) may be performed by a process separate from the computational method. Thus, in these embodiments, the computational method does not itself include the storing step (e), but makes the instantiated values and the data output (of the simulation engines) available to the separate process.

A reservoir model scaling engine may be executed inside the iteration loop or prior to the iteration loop. The scaling engine may serve to scale one or more geocellular reservoir models in the set of models to a lower target resolution. A schedule resolver program may be executed inside the iteration loop to generate instantiated schedule from a first subset of the set of models and a first subset of the instantiated values. A well perforator program may also be executed inside the iteration loop. The well perforator program may compute perforation locations along well plans determined by a second subset of the set of models and a second subset of the instantiated values.

A case includes a set of models and data characterizing probability distributions for planning variables associated with the set of models or representing choices among alternative ones of the models. Over time, a user or set of users may assemble a number of cases and execute the computational method multiple times on each case with different sets of execution constraints. Thus, in some embodiments, a case manager method for organizing cases and variations of cases may include the steps of:

(a) reading cases and models included in the cases from a storage medium;

(b) displaying the names of the cases and the included models to the user;

(c) providing a user interface which allows user interaction with the cases and the included models, wherein the user interaction includes one or more of deleting cases, editing cases, copying cases and creating new cases;

(d) saving new and modified cases and corresponding included models to the storage medium; and (e) loading the cases and the corresponding included models into memory.

The models are models representing components of a value chain (e.g., a petroleum production value chain). The case manager method removes cases and models that have been marked for deletion by said user interaction from the storage medium. The loading step (e) includes loading the cases and the corresponding included models into the memory in an organized form suitable for access by a workflow manager process. The workflow manager process may be configured to read any subset of the loaded cases and the corresponding included models, and to assemble input data sets for one or more simulation engines using instantiated values of the planning variables and the loaded cases and the corresponding included models.

BRIEF DESCRIPTION OF THE DRAWINGS

A better understanding of the present invention can be obtained when the following detailed description is considered in conjunction with the following drawings, in which:

FIG. 5 illustrates one embodiment of a schedule manager interface through which a user may view summary information about existing schedule, and delete schedules;

FIG. 8 illustrates one embodiment of a schedule generator interface through which the user may specify various parameters associated with a schedule, and/or, parameters associated with the inter-schedule dependencies;

Figure 1:
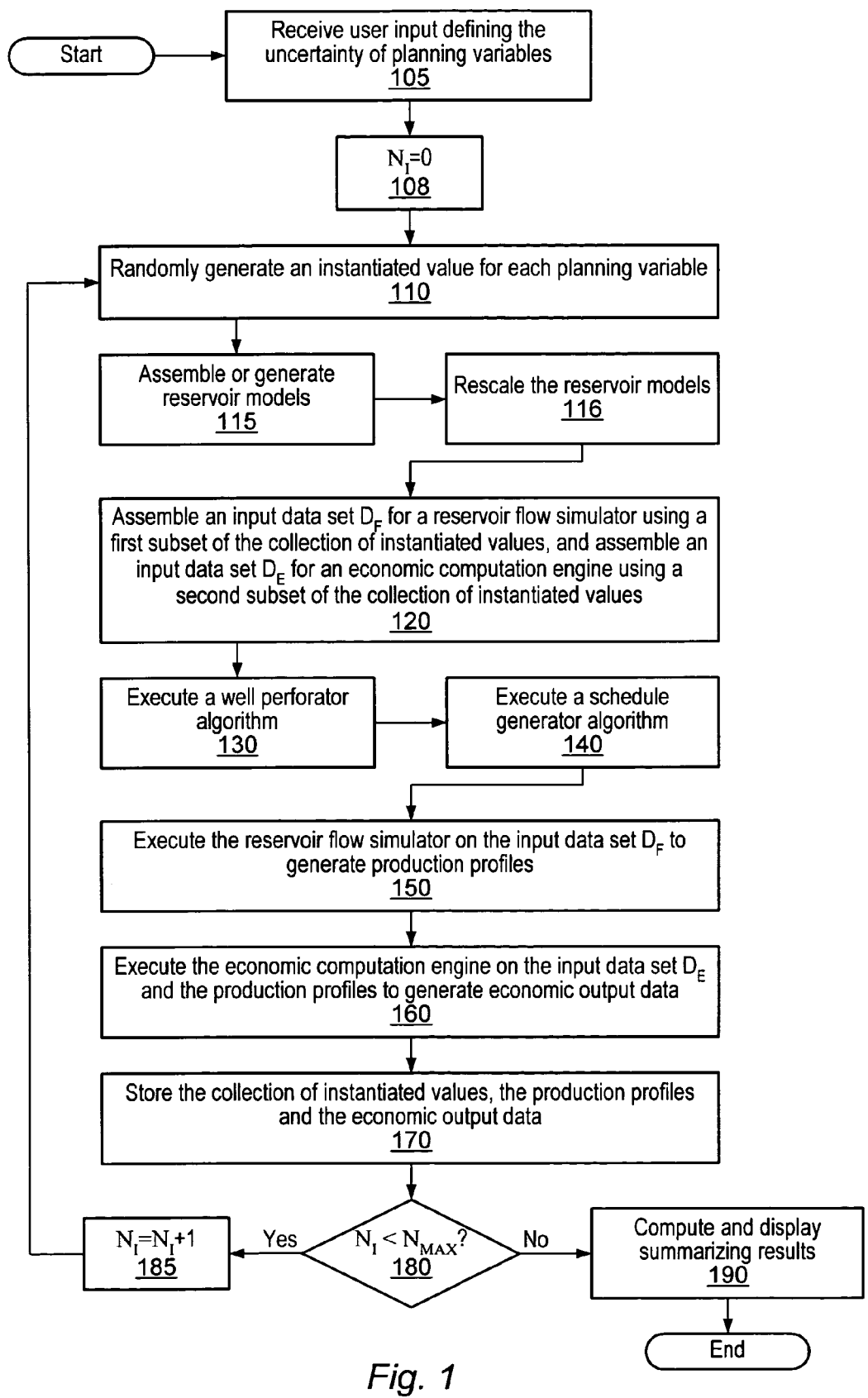
FIG. 1 illustrates one embodiment of a computational method operating in a Monte Carlo mode.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

There are many uncertainties associated with the planning of a petroleum production project. Many physical parameters such as rock permeability, initial fluid pressures and initial saturations are known only to within ranges of values. Often economic parameters such as future tax rates, royalty rates and inflation rates are difficult to predict with accuracy. Many decisions involved in the planning process may have multiple alternative choices (or options or scenarios). For example, a geophysical analysis of a given reservoir may produce a collection of alternative geocellular reservoir models representing different sets of physical assumptions. It is difficult to know which set of physical assumptions is most valid. Similarly, there may be uncertainty associated with choices of well placement, drainage strategy (with or without injection), scheduling of drilling operations, etc.

In one set of embodiments, a computational method for computing and displaying the economic impact of uncertainties associated with the planning of a petroleum production project may be arranged as indicated in FIG. 1. The computational method may be implemented by the execution of program code on a processor (or a set of one or more processors). Thus, the computational method will be described in terms of actions taken by the processor (or set of processors) in response to execution of the program code. The processor is part of a computer system including a memory system, input devices and output devices.

The computational method operates on planning variables. Planning variables may include both controllable parameters and uncontrollable parameters as defined above in the related art section. For example, reservoir physical characteristics, oil prices, inflations rates are uncontrollable parameters, and injection rates for wells are typically controllable parameters. A planning variable that is a controllable parameter is referred to herein as a decision variable.

In step 105, the processor may provide a system of one or more graphical user interfaces $F_G$ through which the user may define the uncertainty associated with each planning variable. The user may define the uncertainty of a planning variable X in a number of ways. For example, the user may select a probability density function (PDF) from a displayed list of standard probability density functions, and enter PDF characterizing values for the selected PDF. The nature of the PDF characterizing values may depend on the selected PDF. A normal PDF may be characterized by its mean and standard deviation. A uniform PDF defined on the interval [A,B] is more easily characterized in terms of the values A and B. A triangular density function defined on the interval [A,B] with maximum at X=C is more easily characterized in terms of the values A, B and C. The list of standard PDFs may include PDFs for normal, log normal, uniform and triangular random variables.

As an alternative, the user may define the uncertainty of a planning variable X by specifying a histogram for the parameter X. In particular, the user may specify values A and B defining an interval [A,B] of the real line, a number $N_C$ of subintervals of the interval [A,B], and a list of $N_C$ cell population values. Each cell population value may correspond to one of the $N_C$ subintervals of the interval [A,B].

As yet another alternative, the user may define the uncertainty of a planning variable X by specifying a finite list of values $X_1, X_2, X_3, \ldots, X_N$ attainable by the parameter X and a corresponding list of positive values $V_1, V_2, V_3, \ldots, V_N$. The processor may compute a sum $S_V$ of the values $V_1, V_2, V_3, \ldots, V_N$, and generate probability values $P_1, P_2, P_3, \ldots, P_N$ according to the relation $P_K=V_K/S_V$. The probability $P_K$ is interpreted as the probability that $X=X_K$. A parameter that is constrained to take values in a finite set is referred to herein as a discrete parameter.

As yet another alternative, the user may define the uncertainty of a planning variable X by specifying a finite set of realizations $R_1, R_2, R_3, \ldots, R_N$ for the planning variable. For example, the user may specify a finite list of geocellular reservoir models by entering their file names. The user may define the uncertainty associated with the planning variable X by entering a set of positive weights $V_1, V_2, V_3, \ldots, V_N$. The processor may compute a sum $S_V$ of the weights $V_1, V_2, V_3, \ldots, V_N$, and generate probability values $P_1, P_2, P_3, \ldots, P_N$ according to the relation $P_K=V_K/S_V$. The probability $P_K$ is interpreted as the probability that $X=R_K$. The realizations of the planning variable may also be referred to herein as "options" or "scenarios" or "outcomes".

The planning variables may be interpreted as random variables by virtue of the user-specified PDFs and/or discrete sets of probability values associated with them. As suggested by the examples above, each planning variable X has an associated space $S_X$ in which it may take values. The space $S_X$ may be a discrete set of values, the entire real line, or an interval of the real line (e.g., a finite interval or a half-infinite interval), or a subset of an $N_X$-dimensional space, where $N_X$ is a positive integer. The space $S_X$ may be defined by the user. Let $G_P$ represent the global parameter space defined by the Cartesian product of the spaces $S_X$ corresponding to the planning variables. The processor may enact a Monte Carlo simulation by performing steps 110 through 170 (to be described below) repeatedly until a termination condition is achieved. The Monte Carlo simulation randomly explores the global parameter space $G_P$.

In some embodiments, the graphical user interfaces $F_G$ may allow the user to supply correlation information. The correlation information may specify the cross correlation between pairs of the planning variables.

In step 108, the processor may initialize an iteration count $N_I$. For example, the iteration count $N_1$ may be initialized to zero.

In step 110, the processor may randomly generate an instantiated value for each planning variable X based on its corresponding PDF or discrete set of probabilities. In other words, the processor randomly selects a value for the planning variable X from its space $S_X$ based on the corresponding PDF or discrete set of probabilities. In those embodiments where correlation information is collected, the instantiated values are generated in a manner that respects the specified cross correlations between planning variables.

To generate an instantiated value for a planning variable X, the processor may execute a random number algorithm to determine a random number $\alpha$ in the closed interval [0,1], and compute a quantile of order a based on the PDF and/or the discrete set of probabilities corresponding to the planning variable X. The computed quantile is taken to be the instantiated value for the planning variable X. The process of generating the quantile for a planning variable X based on the randomly generated number $\alpha$ is called random instantiation.

A quantile of order $\alpha$ for a random variable X is a value Q in the space $S_X$ satisfying the constraints:

Probability $(X \leq Q) \geq \alpha$ and

Probability $(X \geq Q) \geq 1-\alpha$.

For a random variable having a continuous cumulative probability distribution, the quantile constraints may simplify to the single constraint:

Probability $(X \leq Q) = \alpha$.

Recall that the realizations $R_1, R_2, \ldots, R_N$ of a planning variable are not required to be numeric values. Thus, to carry out the instantiation procedure described above, the processor may interpret the probabilities $P_1, P_2, \ldots, P_N$ of the planning variable as the probabilities of a discrete random variable Y on the set $S_Y=\{1, 2, \ldots, N\}$ or any set of N distinct numerical values. The processor randomly generates an instantiated value J of the discrete variable Y. The instantiated value J determines the selection of realization $R_J$ for the planning variable.

In step 115, the processor may assemble or generate a set $M_{GR}$ of geocellular reservoir models (e.g., a set of geocellular reservoir models determined by one or more of the instantiated values).

In step 116, the processor may operate on one or more of the geocellular reservoir models of the set $M_{GR}$ in order to generate one or more new geocellular reservoir models scaled through a process of coarsening to a lower, target resolution (or set of target resolutions). These new geocellular models may be used as input to the reservoir flow simulator instead of the corresponding models of the set $M_{GR}$. The coarsening process may be used to scale geocellular models down to a lower resolution to decrease the execution time per iteration of the iteration loop.

In one alternative embodiment, the scaling of geocellular reservoir models to a target resolution (or set of target resolutions) may occur prior to execution of the iteration loop, i.e., prior to instantiation step 110. In this alternative embodiment, step 116 as described above may be omitted and step 115 may be reinterpreted as an assembly of the scaled geocellular reservoir models.

In step 120, the processor may assemble an input data set $D_F$ for a reservoir flow simulator using a first subset of the collection of instantiated values, and assemble an input data set $D_E$ for an economic computation engine using a second subset of the collection of instantiated values. The first and second subsets are not necessarily disjoint. The instantiated values may be used in various ways to perform the assembly of the input data sets. For example, some of the instantiated values may be directly incorporated into one or both of the input data sets. (Recall that an instantiated value of a planning variable may be a data structure, e.g., a geocellular reservoir model, a reservoir characteristics model, a set of well plans, etc.). Others of the instantiated values may not be directly incorporated, but may be used to compute input values that are directly incorporated into one or both of the input data sets.

In step 130, the processor may supply well plan information per well to a well perforator and invoke execution of the well perforator. The well perforator may compute one or more perforation locations along each well plan. The well perforation locations per well may be appended to the input data set $D_F$.

In step 140, the processor may supply instantiated values for parameters such as (a) well drilling time, well perforation time, well completion time per well or group of wells and (b) facility establishment time per facility to a schedule resolver, and invoke execution of a schedule resolver. The schedule resolver computes schedules defining significant dates such as production start date per well, drilling start date and end date per well, completion start date and end date per well, start and end dates of facility establishment per facility, and so on. The schedules may be appended to the input data set $D_F$ and the input data set $D_E$.

In step 150, the processor may supply the input data set $D_F$ to the reservoir flow simulator and invoke execution of the reservoir flow simulator. The reservoir flow simulator may generate production profiles of oil, gas and water for wells and/or facilities defined by the input data set $D_F$. The reservoir flow simulator may have any of various forms, including but not limited to a finite difference simulator, a material balance simulator, or a streamline simulator.

In step 160, the processor may supply the production profiles (generated by the reservoir simulator) and the input data set $D_E$ to the economic computation engine. The economic computation engine computes economic output data based on the production profiles and the input data set $D_E$. The economic output data may include a stream of investments and returns over time. The economic output data may also include a net present profit value summarizing the present effect of the stream of investments and returns.

In step 170, the processor may store (or command the storage of) an iteration data set including (a) the collection of instantiated values generated in step 110, (b) the production profiles generated by the reservoir flow simulator, and (c) the economic output data onto a memory medium (e.g., a memory medium such as magnetic disk, magnetic tape, bubble memory, semiconductor RAM, or any combination thereof). The iteration data set may be stored in a format usable by a relational database such as Open DataBase Connectivity (ODBC) format or Java DataBase Connectivity (JDBC) format.

In step 180, the processor may determine if the iteration count $N_1$ is less than an iteration limit $N_{MAX}$. The user may specify the iteration limit $N_{MAX}$ during a preliminary setup phase. If the iteration count $N_1$ is less than the iteration limit, the processor may continue with step 185. In step 185, the processor may increment the iteration count $N_1$. After step 185, the processor may return to step 110 for another iteration of steps 110 through 170.

If the iteration count $N_1$ is not less than the iteration limit, the processor may continue with step 190. In step 190, the processor may perform computations on the iteration data sets stored in the memory medium, and display the results of said computations. For example, the processor may compute and display a histogram of net present value. As another example, the processor may display a collection of graphs, each graph representing economic return versus time for a corresponding iteration of steps 110 through 170. The collection of graphs may be superimposed in a common window for ease of comparison.

After the computational method has concluded, the user may invoke a relational database program to perform analysis of the iteration data sets that have been stored on the memory medium.

In one alternative embodiment of step 180, the processor may perform a test on the time $T_E$ (e.g., clock time or execution time) elapsed from the start of the computational method instead of a test on number of iterations. The processor may determine if the elapsed time $T_E$ is less than (or less than or equal to) a limit $T_{MAX}$. The limit $T_{MAX}$ may be specified by the user. In this alternative embodiment, step 108 may include the act of reading of an initial timestamp $T_0$ from a system clock. In step 180, the processor may read a current time $T_C$ from the system clock, compute the elapsed time $T_E$ according the relation $T_E = T_C - T_0$, and compare the elapsed time $T_E$ to the time limit $T_{MAX}$.

The computational method as illustrated in FIG. 1 performs stochastic sampling (i.e., random instantiation) of planning variables, and thus, enacts a Monte Carlo simulation. There are a number of different methods for performing the stochastic sampling, and thus, other embodiments of the computational method are contemplated which use these different stochastic sampling methods. For example, in one embodiment, the computational method uses Latin Hypercube sampling Latin Hypercube sampling may be used to obtain samples of a random vector $\xi = [\xi_1, \xi_2, \ldots, \xi_n]$. Let N be the size of the population of samples. The range of each random variable $\xi_k$ may be divided into N non-overlapping intervals having equal probability mass 1/N according to the probability distribution for variable $\xi_k$. A realization for variable $\xi_k$ may be randomly selected from each interval based on the probability distribution of variable $\xi_k$ in that interval. The N realizations of variable $\xi_1$ are randomly paired with the N realizations of $\xi_2$ in a one-to-one fashion to form N pairs. The N pairs are randomly associated with the N realizations of $\xi_3$ in a one-to-one fashion to form N triplets. This process continues until N n-tuples are obtained. The n-tuples are samples of the random vector $\xi$.

Additional information on Latin Hypercube sampling may be found in the following references:
(1) "Controlling Correlations in Latin Hypercube Samples", B. Owen, Journal of the American Statistical Association, volume 89, no. 428, pp 1157-1522, December 1994;
(2) "Large Sample Properties of Simulations using Latin Hypercube Sampling", M. Stein, Technometrics, volume 29, no 2, pp 143-151, May 1987.

These references are hereby incorporated by reference in their entirety.

In some embodiments, the computational method is configured to operate in a number of alternative modes. The user may select the operational mode. In the Monte Carlo mode (described above in connection with FIG. 1), the processor randomly generates vectors in the global parameter space $G_P$. In a "discrete combinations" mode, the user defines a finite set of attainable values for each planning variable, and the processor exhaustively explores the Cartesian product of the finite sets. In a "sensitivity analysis" mode, the user defines a finite set of attainable values for each planning variable, and the processor explores along linear paths passing through a user-defined base vector in the Cartesian product, each linear path corresponding to the variation of one of the planning variables. Thus, the sensitivity analysis mode allows the user to determine which planning variable has the most influence on net present value and/or economic return.

Figure 2:
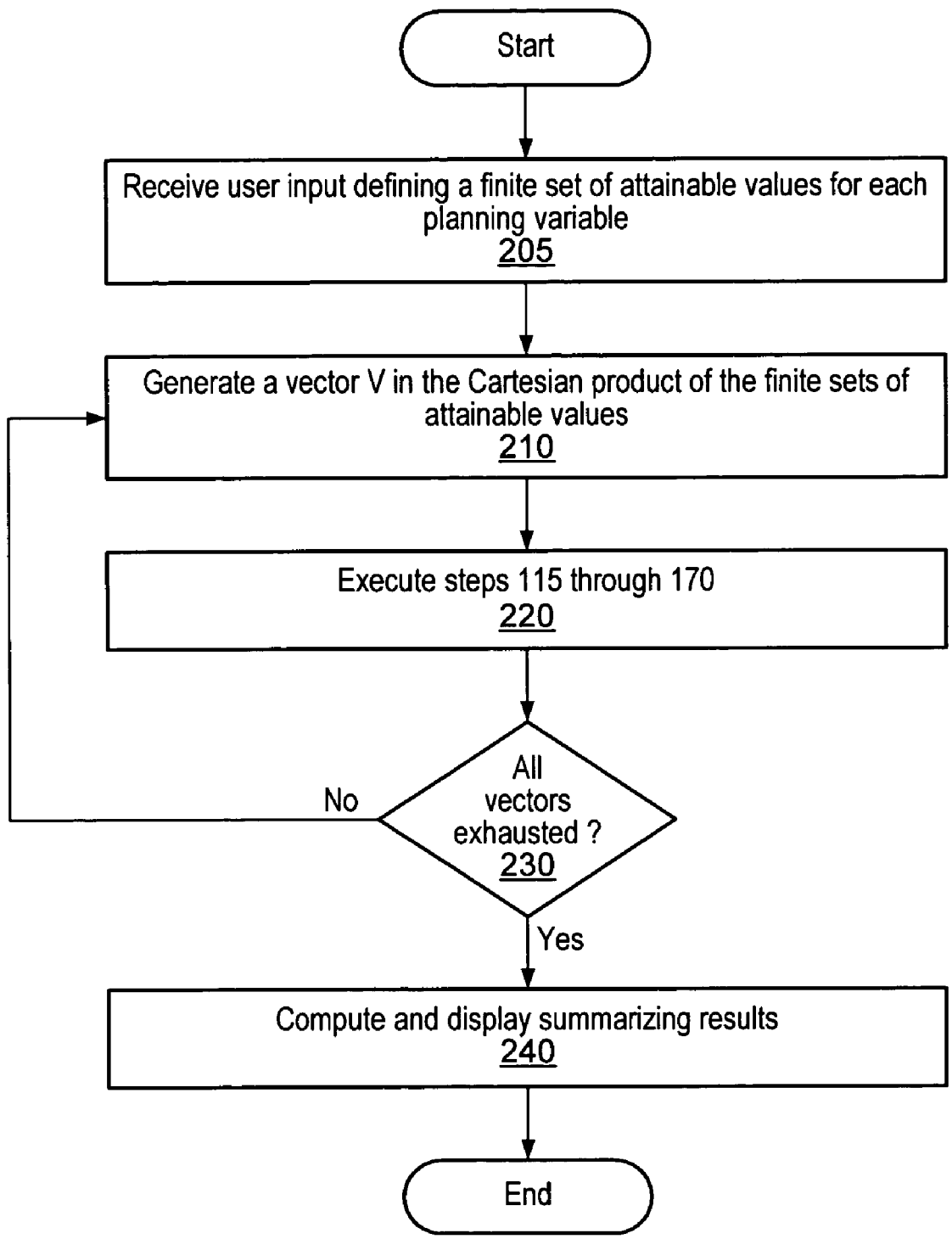
FIG. 2 illustrates another embodiment of the computational method operating in a discrete combinations mode.

FIG. 2 illustrates one set of embodiments of the computational method operating in the discrete combinations mode.

In step 205, the processor may provide a system of one or more graphical user interfaces through which the user may define a finite set of attainable values (or realizations) for each planning variable. Let $X^1, X^2, X^3, \ldots, X^M$ denote the planning variables. After having performed step 205, each planning variable $X^J$ will have been assigned a finite set $S_{XJ}$ of attainable values. (Recall that attainable values may be numeric values, or sets of numeric values or data structures.)

Let $P_C$ denote the Cartesian product of the finite sets $S_{XJ}$ for $J=1, 2, \ldots, M$. Let $L_J$ denote the size (number of elements) in finite set $S_{XJ}$. Thus, the Cartesian product $P_C$ has size $N_{DC}=L_1*L_2*\ldots*L_M$. An element of the Cartesian product is a vector of the form $(x^1, x^2, \ldots, x^M)$, where $x^J$ is an attainable value of the planning variable $X^J$.

The user may specify the finite set $S_{XJ}$ of attainable values for a planning variable $X^J$ by entering the values of the finite set $S_{XJ}$ through a keyboard or numeric keypad.

As an alternative, the user may specify the finite set $S_{XJ}$ of attainable values for the planning variable $X^J$ to be a set of quantiles $Q_{T1}, Q_{T2}, \ldots, Q_{TL}$ of a PDF by selecting the PDF from a displayed list of standard PDFs, and entering the numbers T1, T2, ..., TL, e.g., numbers in the interval [0,100]. The notation $Q_T$ denotes the quantile of order T/100 derived from the selected PDF. The numbers T1, T2, ..., TL are referred to herein as quantile specifiers. For example, the user may select a normal PDF and enter the quantile specifiers 15, 50 and 85 to define the finite set $S_{XJ}=\{Q_{15}, Q_{50}, Q_{85}\}$. Instead of entering the quantile specifiers T1, T2, ..., TL, the user may select from a list $L_{QS}$ of standard sets of quantile specifiers, e.g., sets such as {50}, {33.3, 66.7}, {25, 50, 75}, {20, 40, 60, 80}. For example, selection of the specifier set {20, 40, 60, 80} specifies the finite set $S_{XJ}=\{Q_{20}, Q_{40}, Q_{60}, Q_{80}\}$ based on the selected PDF. It may be advantageous to remind the user that the quantile specifiers appearing in the standard sets of the list $L_{QS}$ are indeed specifiers of quantiles. Thus, in some embodiments, the graphical user interface may display a character string of the form "$Q_{T1}, Q_{T2}, \ldots, Q_{TL}$" to indicate each standard set {T1, T2, ..., TL} of the list $L_{QS}$.

As yet another alternative, the user may specify the finite set $S_{XJ}$ of attainable values for the planning variable $X^J$ to be a set of the form $\{A+k(B-A)N_S: k=0, 1, 2, \ldots, N_S\}$ by (a) entering values A, B and $N_S$. In this case the ($N_S$+1) attainable values are equally spaced through the closed interval [A,B].

In the discrete combinations mode, the processor performs $N_{DC}$ iterations of steps 115 through 170 (of FIG. 1), i.e., one iteration for each vector $V=(x^1, x^2, \ldots, x^M)$ in the Cartesian product $P_C$. Thus, in step 210 the processor generates a vector $V=(x^1, x^2, \ldots, x^M)$ in the Cartesian product $P_C$, where $x^J$ is an attainable value of the planning variable $X^J$.

In step 220, the processor executes steps 115 through 170 described above in connection with FIG. 1. The discussion of steps 115 through 170 refers to instantiated values of the planning variables. In the discrete combinations mode, the instantiated values of the planning variables are the values $x^1, x^2, \ldots, x^M$. The planning variables are not interpreted as random variables in the discrete combinations mode.

In step 230, the processor determines if all vectors in the Cartesian product $P_C$ have been visited. If all vectors in the Cartesian product $P_C$ have not been visited, the processor returns to step 210 to generate a new vector (i.e., a vector that has not yet been visited) in the Cartesian product $P_C$.

If all the vectors in the Cartesian product $P_C$ have been visited, the processor continues with step 240. In step 240, the processor may perform computations on the iteration data sets stored in the memory medium, and display the results of said computations. For example, the processor may compute and display a histogram of net present value. As another example, the processor may display a collection of graphs, each graph representing economic return versus time for a corresponding iteration of steps 210 and 220. The collection of graphs may be superimposed in a common window for ease of comparison.

Figure 3:
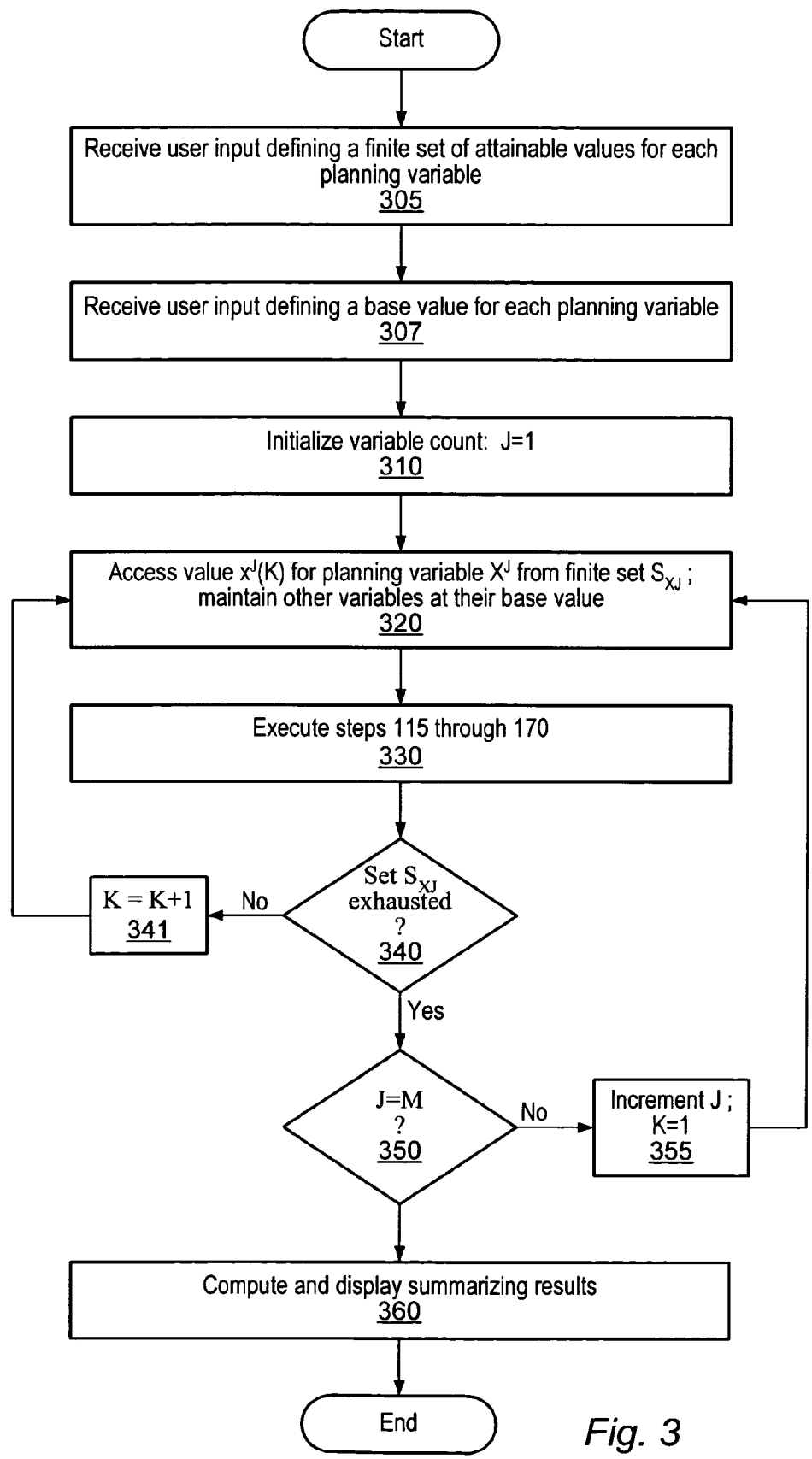
FIG. 3 illustrates yet another embodiment of the computational method operating in a sensitivity analysis mode.

FIG. 3 illustrates one set of embodiments of the computational method operating in the sensitivity analysis mode.

In step 305, the processor may provide a system of one or more graphical user interfaces through which the user may specify a finite set of attainable values (or realizations) for each planning variable. Let $X^1, X^2, X^3, \ldots, X^M$ denote the planning variables. After having performed step 305, each planning variable $X^J$ will have been assigned a finite set $S_{XJ}$ of attainable values.

Let $P_C$ denote the Cartesian product of the finite sets $S_{XJ}$ for $J=1, 2, \ldots, M$. Let $L_J$ denote the size (number of elements) in finite set $S_{XJ}$. An element of the Cartesian product is a vector of the form $(x^1, x^2, \ldots, x^M)$, where $x^J$ is an attainable value of the planning variable $X^J$.

In step 307, the user may specify a base value $B^J$ for each planning variable $X^J$ from the finite set $S_{XJ}$.

In step 310, the processor may initialize a variable counter J to one.

In step 320, the processor may access a value $X^J(K)$ for the planning variable $X^J$ from the finite set $S_{XJ}$. All other planning variables $X^I$, $I\neq J$, are maintained at their base values, i.e., $x^I=B^I$. Index K may be initialized (e.g., to one) prior to step 320.

In step 330, the processor executes steps 115 through 170 described above in connection with FIG. 1. The discussion of steps 115 through 170 refers to instantiated values of the planning variables. In the sensitivity analysis mode, the instantiated values of the planning variables are the values $x^1$, $x^2, \ldots, x^M$.

In step 340, the processor determines if all the attainable values of the finite $S_{XJ}$ have been visited. If all the attainable values of the finite set $S_{XJ}$ have not been visited, the processor may increment the index K (as indicated in step 341) and return to step 320 to access a next value for the planning variable $X^J$ from the finite set $S_{XJ}$.

If all the attainable values of the finite set $S_{XJ}$ have been visited, the processor may continue with step 350. In step 350, the processor may determine if the variable count J equals M. If the variable count J is not equal to M, the processor may increment the variable counter J and reinitialize the index K (as indicated in step 355) and return to step 320 to start exploring the next planning variable.

If the variable count J is equal to M (indicating that all the planning variables have been explored), the processor may continue with step 360. In step 360, the processor may perform computations on the iteration data sets stored in the memory medium, and display the results of said computations as described above in connection with FIGS. 1 and 2.

The computational method includes an iteration loop that executes a number of times until a termination criteria is achieved. In FIG. 1, the iteration loop is represented by steps 110 through 185. In FIG. 2, the iteration loop is represented by steps 210 through 230. In FIG. 3, the iteration loop is represented by steps 320 through 355.

In some embodiments, the processor may operate on the one or more geocellular reservoir models which have been supplied as input in order to generate new geocellular reservoir models scaled to a target resolution (or set of target resolutions). These new geocellular models may be used in the iteration loop instead of the originally supplied geocellular models. The scaling operation may be used to scale geocellular models down to a lower resolution to decrease the execution time per iteration.

It is noted that any of the various embodiments of the computational method described above may be implemented as a system of software programs for execution on any of a variety of computer systems such as desktop computers, minicomputers, workstations, multiprocessor systems, parallel processors of various kinds, distributed computing networks, etc. The software programs may be stored onto any of a variety of memory media such as CD-ROM, magnetic disk, bubble memory, semiconductor memory (e.g. any of various types of RAM or ROM). Furthermore, the software programs and/or the results they generate may be transmitted over any of a variety of carrier media such as optical fiber, metallic wire, free space and/or through any of a variety of networks such as the Internet and/or the PSTN (public switched telephone network).

Figure 4:
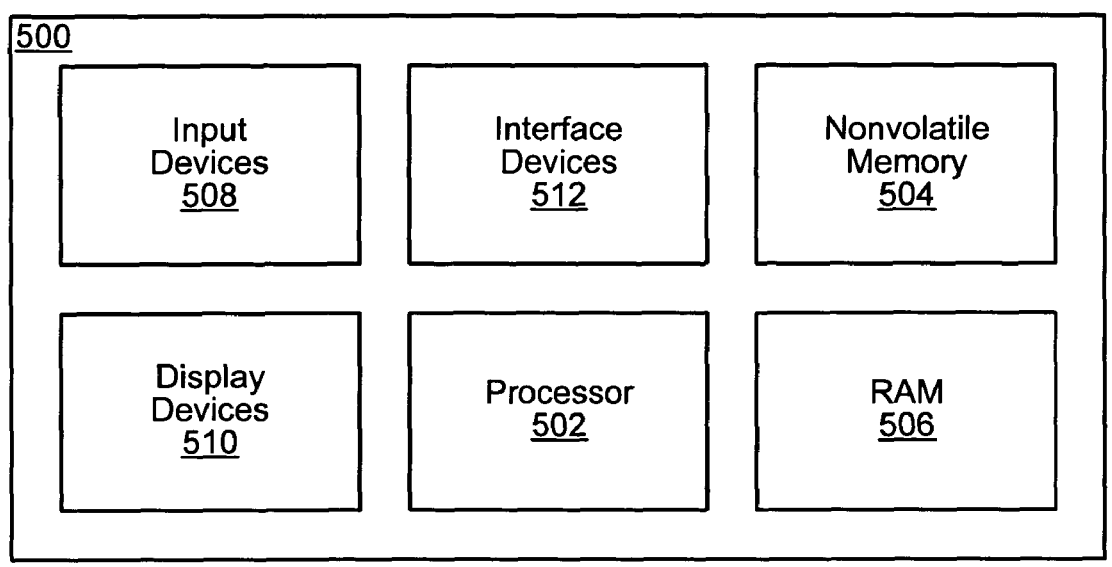
FIG. 4 illustrates one embodiment of a computer system operable to perform the computational method.

FIG. 4 illustrates one embodiment of a computer system 500 operable to perform the computational method. Computer system 500 may include a processor 502, memory (e.g. random access memory 506 and/or nonvolatile memory devices 504), one or more input devices 508, one or more display devices 510, and one or more interface devices 512. These component subsystems may be interconnected according to any of a variety of configurations or system topologies. Nonvolatile memory devices 504 may include devices such as tape drives, disk drives, semiconductor ROM or EEPROM, etc. Input devices 508 may include devices such as a keyboard, mouse, digitizing pad, trackball, touch-sensitive pad and/or light pen. Display devices 510 may include devices such as monitors, projectors, head-mounted displays, etc. Interface devices 512 may be configured to receive data from and/or transmit data to one or more remote computers and/or storage devices through a network.

Processor 502 may be configured to read program instructions and/or data from RAM 506 and/or nonvolatile memory devices 504, and to store computational results into RAM 506 and/or nonvolatile memory devices 504. The program instructions may be program instructions defining the computational method, an operating system, a set of device drivers, etc.

In one set of embodiments, a system of software programs may be configured to perform decision analysis and uncertainty evaluation to assist in the planning of a petroleum exploration and production project. The system of software programs may be referred to herein as a decision management system (DMS) as it allows a user to evaluate the economic impact of numerous decision alternatives (e.g., scenarios) and parameter uncertainties associated with a prospect or field. The decision management system integrates the simulation of a value chain including a number of reservoirs, wells, facilities, and couplings between the wells and the facilities. The decision management system may also highlight uncertainties and risks to capital investment.

The decision management system may include a controller program and a collection of supporting programs. The controller program and the supporting programs may execute on a set of one or more processors, e.g., on processor 502 of FIG. 4. The controller program may direct the execution of the computational method as described variously above in connection with FIGS. 1-3. The supporting programs may include the following programs.

Supporting Programs (1) A model manager provides an interface through which the user may establish the source locations (in the memory system of a computer or computer network) for models. The models include data structures that represent components of the value chain and data structures associated with components of the value chain. For example, the models may include geocelluar models for reservoirs, models of the physical characteristics of reservoirs, well location and well plan models, well drilling schedules, well production schedules, models for the establishment of facilities, models of capital investment expenses, models of operating expenses, and fiscal regime models.

In some embodiments, the user may specify the source locations of models generated by a well and facility asset planning tool such as the DecisionSpace AssetPlanner™ produced by Landmark Graphics.

Any of various types of geocelluar models may be supported. Furthermore, a wide of range of geocellular model resolutions may be supported. For example, in one set of embodiments, the model manager may support geocellular models ranging from high-resolution models having hundreds of thousands of cells to low-resolution models having tens (or less) of cells. High-resolution models constructed by rigorous geologic and geophysical procedures may also be supported.

The model manager interface may also allow the user to manage the models.

(2) A case generator provides an interface through which the user may assemble a case by selecting models (or groups of models) from the set of models established via the model manager. For example, the user may form a case by selecting a geocellular reservoir model, a reservoir characteristics model, a set of well location and well plan models, a set of well drilling schedules, and a set of a well production schedules. The selected models may include planning variables. Thus, the case generator interface may allow the user to specify the randomness (or the set of attainable values) associated with any planning variables corresponding to the selected models.

The user may be interested in constructing planning variables from models in order to explore the implications of various alternative scenarios. (See the discussion of planning variables presented above in connection with FIGS. 1-3.) Thus, the case generator interface allows the user to define a planning variable by selecting models (from the set of models established through the model manager) as realizations of the planning variable. For example, the user may select two or more geocellular models for a given reservoir as realizations of a first planning variable; and select two or more well production schedules for a given well (or group of wells) as realizations of a second planning variable. If the user wishes to have a planning variable treated as a random construct, the user may additionally specify probabilities values (or positive numeric values which are subsequently scaled to probability values) corresponding to the realizations of the planning variable.

Models and planning variables may themselves be assembled to form higher-order planning variables. Thus, the present invention contemplates the use of planning variables which represent hierarchical trees of decisions, each decision having a set of alternative outcomes.

The user's interaction with the case generator interface results in the construction of a case. A case may include one or more models and a characterization of the randomness (or set of attainable values) of each planning variable.

Let $M_C$ denote the set of models in a case. A model that is not included as a realization of any planning variable is said to be a noncontingent model. A model that is included as a realization of one or more planning variables is said to be a contingent model.

(3) A reservoir model scaling engine (RMSE) operates on a first geocelluar reservoir model having a first resolution to generate a second geocelluar reservoir model having a second resolution. The user may specify the second resolution (i.e., the target resolution). The scaling engine may be used to generate a lower resolution geocellular model in order to decrease the execution time of each iteration of steps 110 through 170, especially if a large number of iterations is anticipated.

(4) The instantiation module generates a vector $V=(x^1, x^2, x^3, \ldots, x^M)$ in the global parameter space defined by the user, where $x^K$ is a value in the space $S_X$ of planning variable $X^K$. In other words, the instantiation module selects (i.e., instantiates) a particular value for each planning variable from the corresponding space $S_X$.

The instantiation module may operate in a plurality of modes. In a Monte Carlo (random) mode, the instantiation module may generate the vector V randomly using the PDFs (and/or discrete sets of probabilities) defined for the planning variables. See the discussion above connected with step 110 of FIG. 1. Repeated invocations of the instantiation module generate vectors which randomly explore the global parameter space. In some embodiments, the instantiation module may employ user-specified cross-correlation information to determine the vector V.

In a discrete combinations mode, the instantiation module may generate the vector V according to a scanning process such as the scanning process illustrated by the following pseudo-code.

```
T ← K₁+1;
For J=1 to M {
    if (T>L_J) {
        if (J=M) { terminate iteration loop };
        else {
            K_J ← 1;
            T ← K_{J+1}+1}
    else {
        K_J ← T;
        x^J ← S_{X,J}(K_J);
        return;
    }}
```

The variables $K_1, K_2, \ldots, K_M$ are state variables that keep track of position in the scanning process. Prior to a first invocation of the instantiation module (e.g., during a preliminary setup phase of the controller program), the state variables may each be initialized to one. M is the number of planning variables. The notation $S_{X,J}(K_J)$ denotes the $K_J^{th}$ element of the finite set $S_{X,J}$ of attainable values corresponding to planning variable $X^J$. The parameter $L_J$ denotes the number of elements in the finite set $S_{X,J}$. The global parameter space has $N_{DC}=L_1 * L_2 * \ldots * L_M$ vector elements. The scanning process illustrated above covers the global parameter space efficiently. In other words, after $N_{DC}$ invocations of the instantiation module, the vector V will have hit each vector element of the global parameter space. The above pseudo-code is not meant to be limiting. A wide variety of alternative forms are contemplated.

In a sensitivity analysis mode, the instantiation module may generate the vector V according to a "move one at a time" process such as that given by the following pseudo-code.

```
T ← K+1
if (T>L_J) {
    if (J=M) {terminate iteration loop };
    else {
        x^J=B^J
        J ← J+1
        K ← 1
        x^J ← S_{X,J}(1)
        return
    }
else {
    K ← T;
    x^J ← S_{X,J}(K);
    return;
}}
```

J is a state variable indicating the currently active planning variable $X^J$. J may be initialized to 1 prior to a first invocation of the instantiation module (e.g., in step 310 of FIG. 3). The value $L_J$ denotes the number of elements in the finite set $S_{X,J}$. The variable K is a state variable that keeps track of a current element in the finite set $S_{X,J}$ of attainable values corresponding to the planning variable $X^J$. M is the number of planning variables. The notation $S_{X,J}(K)$ denotes the $K^{th}$ element of the finite set $S_{X,J}$. Prior to a first invocation of the instantiation module (e.g., in step 310), the values $x^2, x^3, \ldots, x^M$ may be initialized to the corresponding user-specified base values, i.e., $x^J \leftarrow B^J$, J=2, 3, ..., M. The value $x^1$ may be initialized to the first element, i.e., $S_{X1}(1)$, of the finite set $S_{X1}$. Repeated invocations of the instantiation module induce movement along paths of the form $(B^1, \ldots, B^{J-1}, S_{XJ}(K), B^{J+1}, \ldots, B^{M-1}, B^M)$, $J=1, 2, 3, \ldots, M$ and $K=1, 2, \ldots, L_J$. The above pseudo-code is not meant to be limiting. A wide variety of alternative forms are contemplated.

In other embodiments, any of various experimental design techniques may be used to generate vectors in the global parameter space for the iterative simulation (i.e., the computational method).

(5) A workflow manager uses the set $M_C$ of models in the current case and the vector V of instantiated values to assemble an input data set for each of one or more simulation engines (e.g., simulation engines such as the reservoir flow simulator and economic computation engine). Recall that a first subset of the planning variables have models (i.e., the contingent models) as their realizations. A second subset of the planning variables may characterize parameters within the models (i.e., contingent models and noncontingent models). In one set of embodiments, the workflow manager may generate copies of (a) the noncontingent models of the set $M_C$ and (b) the contingent models (i.e., realizations) determined by the instantiated values of the first subset of planning variables, and substitute instantiated values of the second subset of planning variables into the copies, thereby forming instantiated models. The instantiated models may be used to assemble the input data sets for the simulation engines.

(6) A set of one or more simulation engines may be invoked in each iteration of the iterative simulation. The simulation engines may include a reservoir flow simulator and an economic computation engine.

The reservoir flow simulator may operate on a first input data set including a first subset of the instantiated models (e.g., a geocellular reservoir model, a reservoir physical characteristics model, a set of well location and well plan models, and a set of well production schedules) to generate flows of oil, gas, and water and pressures as they change over time within the value chain. The flow simulator may be of several forms, including, but not limited to, a finite difference simulator, a material balance simulator, or a streamline simulator. In some embodiments, the flow simulator is a full-physics finite difference flow simulator with coupled reservoir, well and surface pipeline hydraulic representation.

The economic computation engine may operate on the flow simulator output and a second input data set (including a second subset of the instantiated models, e.g., instantiated models for capital investment expense, operating expense, and fiscal regime) to generate economic output data. The economic computation engine may be implemented in any of various forms. For example, the economic computation engine may be written in any of various programming languages (such as C, C++, jython, or awk). In some embodiments, the economic computation engine may be implemented as a spreadsheet (e.g., an Excel spreadsheet).

(7) A probability manager may be provided to support step 105 of FIG. 1. The probability manager provides a graphical interface which allows the user to assign a probability density function (or discrete probability distribution or histogram) to a planning variable. The probability manager interface may display a list of standard PDF types such as normal, lognormal, beta, triangle, gamma, exponential and uniform. The user may select from the displayed list to specify a PDF type, and enter PDF characterizing parameters to define a particular PDF within the specified type. Alternatively, the user may define the probability distribution of a planning variable by entering a finite set of values (or realizations) attainable by the planning variable and an associated set of probability values (or positive numeric values which are subsequently normalized to probability values). As yet another alternative, the user may specify a histogram to define the probability distribution of a planning variable.

(8) A Monte Carlo engine randomly generates an instantiated value for a planning variable based on the PDF (or discrete probability distribution) defined for the planning variable. The Monte Carlo engine may be invoked repeatedly by the instantiation module in the Monte Carlo mode. In one set of embodiments, the Monte Carlo engine may execute a random number algorithm to determine a random number ac in the closed interval [0,1], and compute a quantile of order $\alpha$ based on the PDF and/or discrete probability distribution corresponding to the planning variable X. The computed quantile is taken to be the instantiated value for the planning variable X. The process of generating the quantile for a planning variable X based on the randomly generated number $\alpha$ is called random instantiation.

A quantile of order $\alpha$ for a random variable X is a value Q in the space $S_X$ satisfying the constraints:

Probability $(X \leq Q) \geq \alpha$ and

Probability $(X \geq Q) \geq 1-\alpha$.

For a random variable having a continuous cumulative probability distribution, the quantile constraints may simplify to the single constraint:

Probability $(X \leq Q) = \alpha$.

(9) A schedule resolver operates on instantiated values of scheduling parameters (such as well drilling time, well perforation time, well completion time, facility establishment time) and generates schedules for the drilling and completion of wells and schedules for the establishment of facilities. The well schedules include production start dates per well. The schedule resolver may use information about well plan models and production platform connections.

(10) A well perforator operates on a set of instantiated well plans and a set of instantiated geocellular reservoir models to compute perforation locations for each of the wells. The perforation locations may be appended to the input data set $D_F$ to be supplied to the reservoir flow simulator. The well perforator may be executed in each iteration of the iterative simulation (because each iteration may yield a different set of instantiated well plans and a different set of instantiated geocellular reservoir models).

(11) A run execution manager manages a number of iterations (of the iteration loop of the computational method). Each iteration may include an execution of the workflow manager, the one or more simulation engines, the instantiation module, the well perforator and the data manager. In the Monte Carlo (random) mode, the instantiation module may repeatedly invoke the Monte Carlo engine.

(12) A data manager collects the instantiated values of the planning variables (i.e., the vector V) generated in an iteration and the data outputs of the simulation engines (e.g., the reservoir flow simulator and the economic computation engine) to form an iteration data set, and stores the iteration data set in memory. The data manager may arrange the data of the iteration data set for storage in a columnar or relational data base access format such as Open DataBase Connectivity (ODBC) format or Java DataBase Connectivity (JDBC) format.

The data manager enables many commonly available graphical and data analysis applications access to the relational data. In various embodiments the output data comprise oil, gas, and water production or injection rates and pressures over time from wells and facilities, capital investments over time, operating expenses over time, and economic metrics such as rate of return and net present value.

The Computational Method

In one set of embodiments, the computational method may include a setup phase and a computational phase. The controller program may implement the computational method.

(A) Setup Phase
  (1) User interacts with the model manager interface to establish the source locations of various models.
  (2) User interacts with the case generator interface to select models (from among those declared to the model manager) and define planning variables associated with the models, and thereby, to assemble a case. For example, the user may select one or more subsurface reservoir models, well location models, schedule models, cost and fiscal models; characterize the uncertainty (or the attainable value sets $S_X$) of planning variables in any or all of these models, and construct planning variables that represent alternative choices among these models (e.g., among multiple alternative subsurface reservoir models).
  (3) Execute the reservoir model scaling engine. The reservoir model scaling engine operates on the one or more geocellular reservoir models associated with the case to generate one or more output models scaled to a target resolution (or to a set of target resolutions). In the iteration loop of the calculation phase (described below) the output models may be used instead of the original geocellular reservoir models. Execution of the reservoir model scaling engine is optional as the original geocellular models may already have appropriate resolutions. In some embodiments, the reservoir model scaling engine may be configured to operate inside the iteration loop (as described above in connection with step 116) instead of during the setup phase.

(B) Calculation Phase
  The calculation phase includes a sequence of one or more iterations. For each of the iterations, the run execution manager spawns a process that invokes the execution of the instantiation module, the well perforator, the schedule resolver, the workflow manager, the simulation engines, and the data manager. In particular, each iteration may include the following steps:
  (1) Execute the instantiation module to generate instantiated values of the planning variables. The instantiated values adhere to the constraints specified by the user (e.g., constraints on the attainable values of the planning variables, cross-correlations, etc.). In the Monte Carlo mode, the instantiation module may invoke the Monte Carlo engine repeatedly to compute random quantile values for each planning variable (or a selected subset of the planning variables).
  (2) Execute the workflow manager to assemble input data sets for the simulation engines from the instantiated values and the models of the current case. Note that the instantiated value of a planning variable may specify the selection of a model from a group of models.
  (3) Execute the well perforator to compute perforation locations in the instantiated well plans.
  (4) Execute the well schedule resolver to compute well schedules and facility schedules using instantiated scheduling parameters.
  (5) Execute the reservoir flow simulation engine.
  (6) Execute the economic computation engine.
  (7) Execute the data manager.
  (8) Repeat steps (1) through (7) until a termination condition is satisfied.

Steps (1) through (8) may be referred to herein as an iteration loop. The iteration loop may be executed a number of times until the termination condition is achieved.

In some embodiments, the supporting programs of the decision management system may include programs such as a schedule manager, a schedule assigner, a schedule generator and a schedule resolver to support the stochastic generation of schedules. The schedule manager, schedule assigner and schedule generator allow a user to specify a global schedule for a petroleum exploration and production project. The global schedule may include a set of component schedules. Component schedules may be created via the schedule assigner. Each component schedule may include a set of random variables that model processes such as well drilling, perforation and completion for a number of wells, and facility establishment for a number of facilities. The user may assign probability density functions (or discrete probability distributions) to the random variables using the schedule generator. Furthermore, the schedule generator allows the user to specify constraints between components schedules, e.g., constraints such as:
  (a) "schedule B starts no earlier than the end of schedule A", or,
  (b) "schedule C starts X days after Project Start", or,
  (c) "schedule D starts no earlier than the start of production from schedule A", or,
  (d) "schedule E must begin on the date Y", or,
  (e) "schedule F starts Z days after schedule C".

This list of constraints is meant to be suggestive and not exhaustive. The user may declare the dependency variables such as X, Y and Z to be random variables, and to specify the probability density functions (or discrete probability distributions) for the dependency variables.

Within each iteration of the iteration loop (of the computational method), the instantiation module generates instantiated values for the planning variables including the random variables within each component schedule and the dependency variables, and the schedule resolver uses the instantiated values to (a) assemble an instantiation of each component schedule and (b) assemble the instantiated component schedules into an instantiation of the global schedule. In assembling the instantiated component schedules into an instantiation of the global schedule, the schedule resolver respects the user-defined constraints between schedules. The instantiated global schedule may be appended to the input data set $D_E$ for the economic computation engine as suggested in the above description of step 140.

The global schedule may be interpreted as a stochastic process that represents a project from start to finish. The ensemble of instantiations of the global schedule generated in repeated iterations of the iteration loop represents a finite sampling of this stochastic process.

Schedule Manager

The schedule manager supports a graphical user interface through which a user (or a set of users) may view and delete schedules. The schedule manager presents summary information about the set of component schedules in the global schedule. FIG. 5 illustrates one embodiment of the schedule manager interface.

The schedule manager may display the number of facilities and the number of wells associated with each schedule. Furthermore, the schedule manager may display an estimated start date, an estimated end date and an estimated production start date for each schedule. If the start date of a schedule depends on the occurrence of an event from another schedule, this schedule start dependency may be indicated. If the production start date of a schedule depends on the occurrence of an event from another schedule, this production start dependency may also be indicated.

Schedule Assigner

The schedule assigner supports a graphical user interface through which the user (or a set of users) may select wells and/or facilities and assign them to a schedule. The schedule assigner may present a list of wells and facilities from a database that has been manually specified by the user, or, automatically generated by an asset planning tool. The user may select one or more wells and/or facilities from the list, and initiate an addition operation that (a) assigns the selected wells and/or facilities to an existing schedule, or, (b) creates a new schedule and assigns the selected wells and/or facilities to the newly created schedule.

Figure 6:
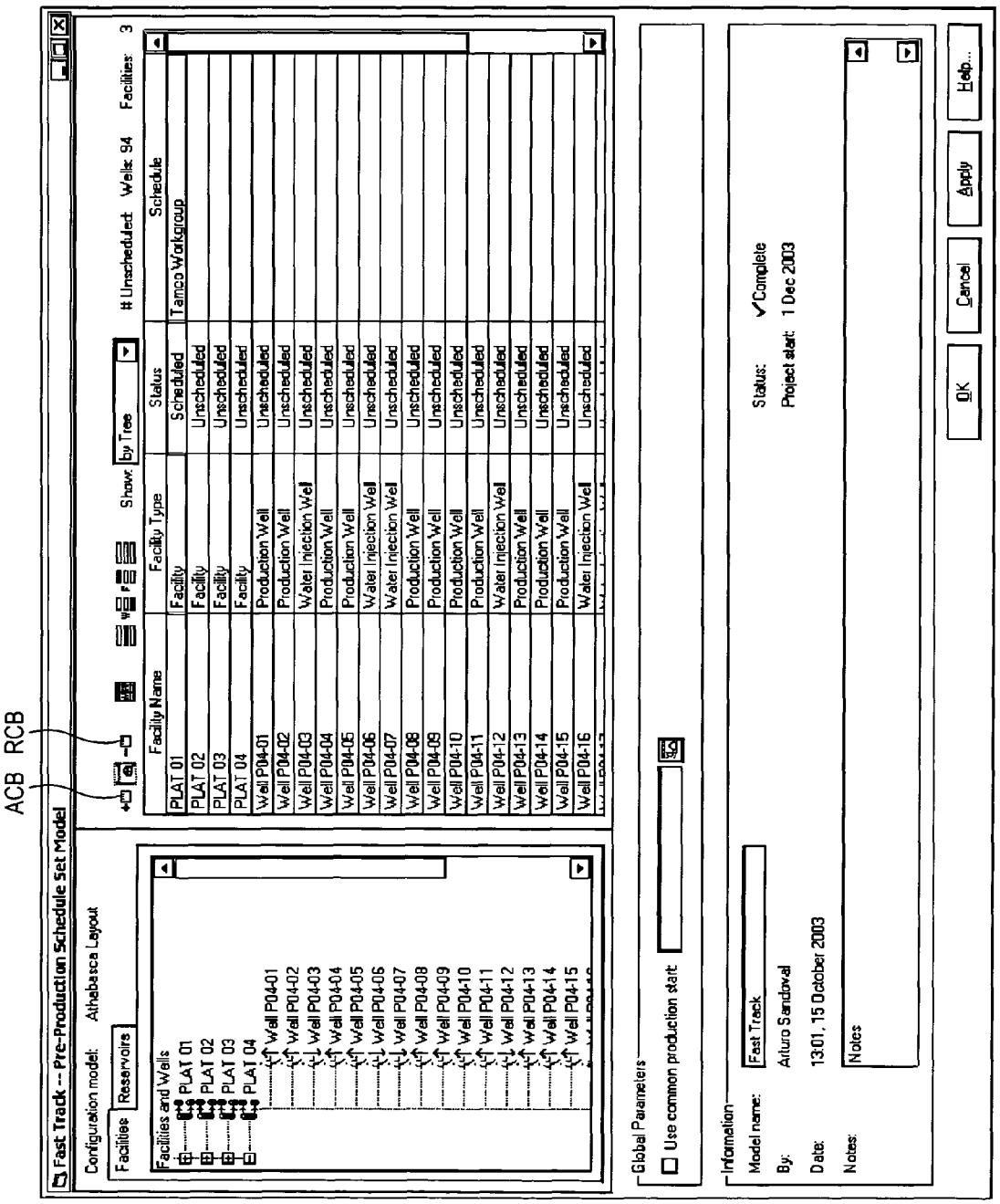
FIG. 6 illustrates one embodiment of a schedule assigner interface through which a user may assign wells and/or facilities to schedules.

FIG. 6 illustrates one embodiment of the schedule assigner interface. The schedule assigner interface may include a selection window that contains a list of entries. Each entry describes a well or a facility. The selection window is capped by a header row that includes field titles such as name, type, status and schedule. The type field specifies whether the entry corresponds to a production well, an injection well or a facility. The name field of an entry gives the user-defined name of the corresponding well or facility. The status field specifies if the corresponding well or facility has already been assigned to a schedule. The schedule field specifies the name of the schedule to which the corresponding well or facility has been assigned. Thus, the first entry listed in the selection window of FIG. 6 is a facility named "Plat 01". Plat 01 has been assigned to a schedule named "Tamco Workgroup".

The wells may be grouped based on the facility to which they are connected as suggested by the directory window to the left of the selection window. The small plus icon to the left of a facility name (such as Platform 01) in the directory window may be selected to induce display of the group of wells associated with the facility. Platform 04 is shown in the expanded form. The small minus icon to the left of a facility name may be selected to unexpand, i.e., to conceal the group of wells associated with the facility. Changes in the expansion state of facilities in the directory window may be reflected in the selection window.

Figure 7:
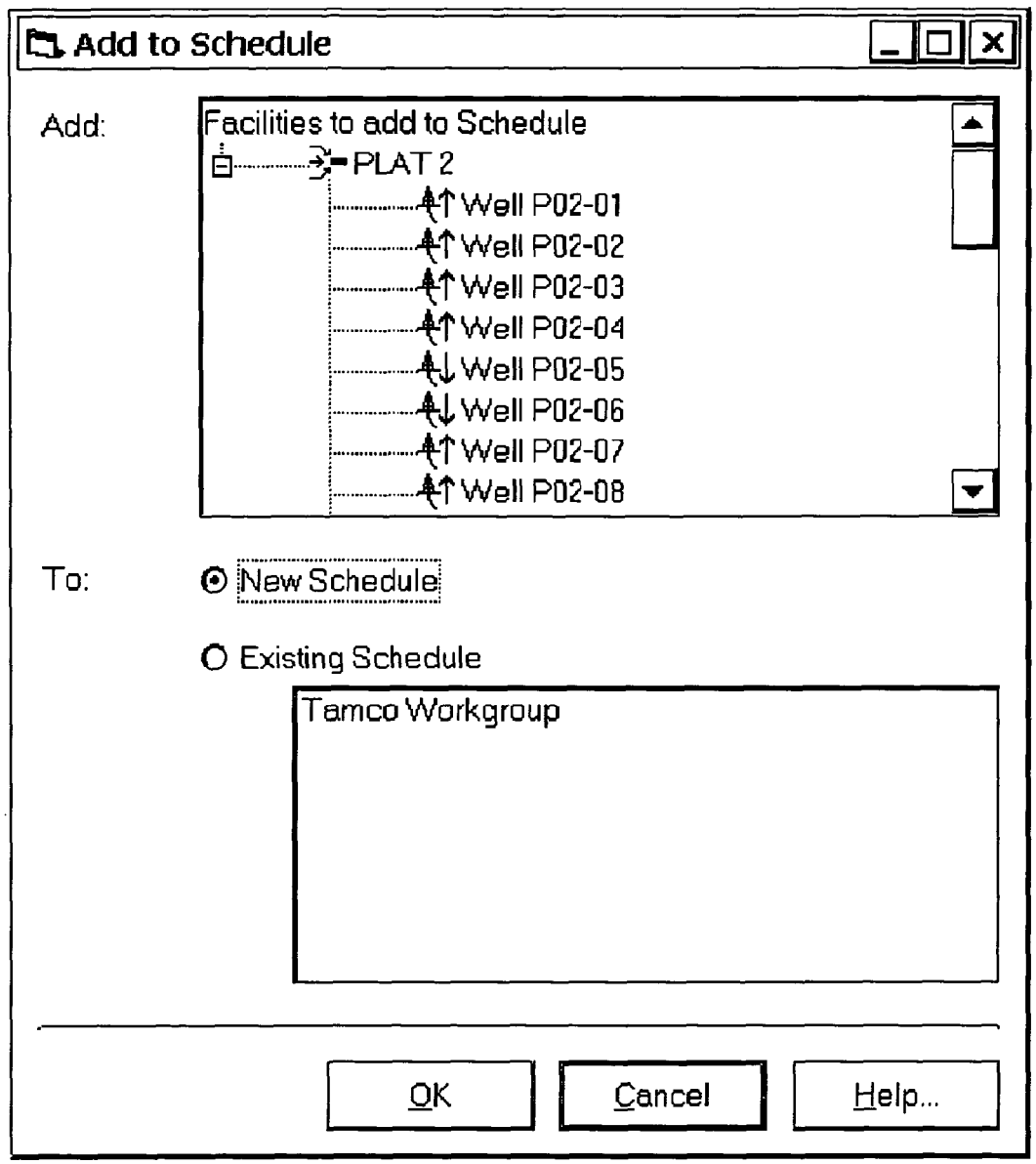
FIG. 7 illustrates one embodiment of a dialog for adding a set of selected wells and/or facilities to an existing schedule or to a schedule to be newly created.

The user may initiate the addition operation by selecting an add control button (ACB) of the assigner interface. In FIG. 6, the add control button is the plus icon above the selection window. As part of the addition operation, the schedule assigner may provide an addition dialog through which the user may specify whether the one or more selected wells and/or facilities are to be added to an existing schedule or to a newly created schedule. FIG. 7 represents one possible embodiment of the addition dialog.

The addition dialog may display a list of the names of existing schedules. If the user specifies the "existing schedule" mode of addition, the user may select one of the existing schedules as the target for the assignment operation. The user may select the "OK" button in the addition dialog to invoke the addition of the selected wells and/or facilities to the selected (existing or to be created) schedule.

The user may also remove wells and/or facilities from a schedule using the schedule assigner interface. The user may select one or more wells and/or facilities that have been previously assigned to a schedule (or schedules), and invoke a removal operation to de-assign the selected wells and/or facilities from the schedule (or schedules). The user may invoke the removal operation by selecting a removal control button (RCB). In FIG. 6, the removal control button RCB is the small minus icon above the selection window in the schedule assigner interface of FIG. 6.

In the embodiment of the schedule assigner as described above, a user may assign the order of wells in a schedule arbitrarily, using the schedule assigner interface.

Examples of situations in which multiple schedules are used in the E&P industry include when multiple drilling rigs are available from contractors at different times and with individual delay probabilities, when multiple completion equipment rigs are available at different times and with individual delay probabilities, and when facility components, e.g. compressors, separators, pipes, etc are designed and fabricated by different processes and contractors on different schedules.

As indicated above, an automated asset planning tool may be used to generate a database of wells and facilities. The wells may be organized into groups according to the facility to which they are coupled. The automated asset planning tool may also generate ordering (or ranking) information for the wells and facilities. For example, the automated asset planning tool may order wells and facilities based on criteria such as drilling cost, facility establishment cost, and conditions (and/or properties) of the reservoirs which source the wells and facilities.

Alternatively, the user may turn on a random order switch for a schedule to invoke random ordering of the wells of the schedule for drilling and completion. In each iteration of the iteration loop, a different random ordering of the wells may be selected.

As used herein the term "well completion" refers to a set of procedures. This set of procedures may include multiple tasks such as setting packers, installing valves, cementing, fracturing, etc.

As used herein the term "facility" refers to a system that receives one or more streams of fluids from a set of wells and/or other facilities, and outputs one or more separate streams of gas, oil, and water to a set of storage vessels, pipelines, or other facilities. Facility is used as a general term to encompass oil and gas field gathering systems, processing platform systems, and well platform systems.

Schedule Generator

As described above, wells and/or facilities are associated with schedules using the schedule assigner. Each schedule may involve the drilling, perforation and completion of one or more wells, and/or, the establishment of one or more facilities. The term "facility establishment" is used herein to describe any collection of processes that contribute to the working realization of a facility. Thus, facility establishment may include processes such as engineering design, detailed design, construction, transportation, installation, conformance testing, etc. Each facility has a capital investment profile (i.e., a time series of capital expenditures) that is determined in part by the time duration of the various establishment processes.

Conceptually, each well associated with a schedule has a drill start date, a drill end date, a completion start date, a completion end date, and a production (or injection) start date. The delay time intervening between the drill end date and the completion start date typically includes a well perforation process. Each facility associated with a schedule has an establishment start date and an establishment end date. A well is said to be ready for production (or injection) at its completion end date. However, the production (or injection) start date for a well is delayed if the well's completion end date precedes the establishment end date of the facility to which the well is connected.

The schedule generator supports a graphical user interface through which a user (or set of users) may specify various kinds of input data for any given schedule. In one set of embodiments, the user may specify:

(1) an order in which wells associated with the given schedule are to be drilled;
(2) a probability density function (or discrete probability distribution) for the time duration of drilling each well associated with the given schedule;
(3) a probability density function (or discrete probability distribution) for the delay time between the end of drilling to the start of the completion process for each well associated with the given schedule;
(4) a probability density function (or discrete probability distribution) for the time duration of the completion process of each well associated with the given schedule;
(5) a probability density function (or discrete probability distribution) for the time duration of the establishment process for each facility associated with the given schedule;
(6) a sequential mode or a parallel mode for handling the establishment processes of the facilities associated with the given schedule;
(7) an "after each" mode or an "after all" mode for handling the completion of wells in the given schedule;
(8) time constraints that qualify events (such as start date, date of first production, date of first injection) in the given schedule relative to events in other schedules or fixed points in time.

The specification of a discrete probability distribution for a discrete variable X involves the specification of a list of pairs $(X_K, P_K)$, where $X_K$ is a value attained by the discrete variable and $P_K$ is the associated probability. For ease of input, the user may specify the pairs as a list of the form: $X_1, P_1, X_2, P_2, \ldots, X_N, P_N$, where N is the number of states attained by the discrete variable. The probabilities $P_K$ may add to one. In some embodiments, the schedule generator may normalize the probabilities if they do not already add to one.

As noted in (1) above, the user may specify the order in which wells are drilled. The user may also specify the order of establishment of the facilities. The later ordering is significant when the sequential establishment mode is selected in (6) above. The ordering of the wells may be independent of the ordering of the facilities.

Figure 8:
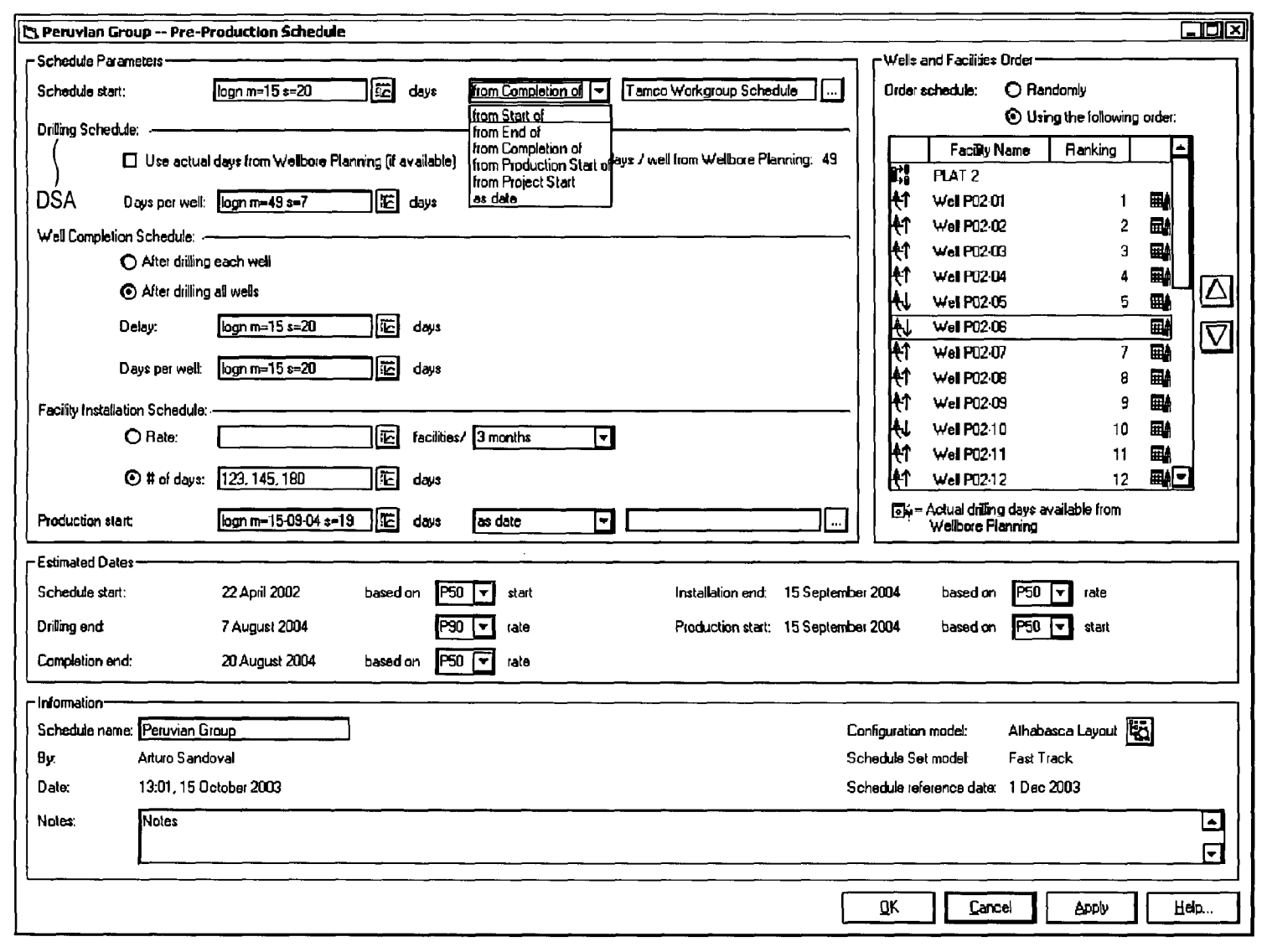

As suggested in FIG. 8, the schedule generator interface may include an ordering window. The ordering window presents a list of the wells and facilities assigned to the given schedule. The user may manipulate the position of wells and facilities in the displayed list, and thus, achieve any desired ordering of wells and/or facilities.

The wells may also be ordered based on the facilities to which the wells belong. Thus, for example, the user could specify that the wells belonging to Plat 2 should be drilled before the wells belonging to Plat 3, and so on.

The schedule generator may also present the user with a set of choices of special well orderings and special facility orderings. For example, the user may select that the wells be ordered according to factors such as expected drilling cost, expected drilling time, expected production potential, expected reservoir quality and that the facilities be ordered according to factors such as establishment cost, establishment time, expected production potential of the wells associated with the facility. The asset planning tool may provide estimates for such factors for each well and/or facility.

As noted in (6) above, the establishment of the facilities associated with the given schedule may proceed in parallel or sequentially. In the parallel mode, the facilities associated with the given schedule are all established in parallel (e.g., starting from the schedule start date). In the sequential mode, the facilities associated with the given schedule are established sequentially (e.g., starting from the schedule start date). The establishment time duration is the time duration for establishment of each facility. The establishment time duration may be a random variable; the user may specify a probability density function (or discrete probability distribution) for the establishment time duration.

As noted in (7) above, the completion of wells may be handled in different ways depending on a mode selection. In the "after each" mode, each well may be completed after it is finished with drilling. In the "after all" mode, the wells may be completed after all wells are finished with drilling, i.e., after the last of the wells is finished with drilling, for each schedule.

The user may specify one or more time constraints that qualify one or more events in the given schedule relative to one or more events in one or more other schedules. For example, the user may specify a constraint that an event in the given schedule occur:

(a) X days after the start date of another schedule;
(b) X days after the end date of another schedule;
(c) X days after the start of drilling (of first well) in another schedule;
(d) X days after the end of drilling (of last well) in another schedule;
(e) X days after the start of the completion process (of first well) in another schedule;
(f) X days after the end of the completion process (of last well) in another schedule; or
(g) X days after the start of production (of first well) in another schedule;

where X is user specified constant or a random variable whose PDF (or discrete probability distribution) is specified by the user. (This list of constraints is meant to be suggestive and not exhaustive.) The delay time X is referred to as a dependency delay time.

The start date of the given schedule is not necessarily dependent on event(s) in another schedule. For example, the user may enter an explicit start end for the given schedule. Alternatively, the user may specify that the start date of the given schedule be X days after the project start date. X may be a user-specified constant or user-specified random variable. In the later case, the user specifies the PDF (or discrete probability distribution) of the random variable.

A schedule may be dependent on multiple other schedules. For example, the user may specify a compound constraint such as "the given schedule starts X days after the start of schedule A and Y days after the start of production in another schedule", where X and Y are user-defined constants or random variables.

In some embodiments, the schedule generator may be configured to support the modeling of multiple tasks within the completion process. For example, the completion process itself may include multiple tasks such as setting packers, installing valves, cementing, fracturing, etc.

In some embodiments, the user may specify a common production start date and/or a common injection start date. The common dates place a constraint on the production (or injection) date of each well in each schedule in the global project. In other words, no well may start production (or injection) before the common production (or injection) date. The schedule assigner interface shown in FIG. 6 has an input field for entering a common production start date.

As described above, the schedule generator allows the user to specify a PDF (or discrete probability distribution) for the drilling time duration. Alternatively, the schedule generator may support a mode in which the drilling time duration for each well is determined by a drilling time estimate provided by the asset planner as suggested by the drilling schedule area DSA of the schedule generator interface of FIG. 8.

The schedule generator may offer the user a choice of programmed standard PDFs that include a normal distribution, a lognormal distribution, a beta distribution, a triangular distribution, a gamma distribution, an exponential distribution, and a uniform distribution. For example, the user may select one of the standard PDFs, and specify PDF characterizing parameters such as mean and standard deviation (or endpoints of the interval of definition in the case of a uniform distribution). In FIG. 8, the variable m denotes the mean and the variable s denotes the standard deviation. Thus, the notation "logn m=15, s=20" specifies a lognormal distribution with a mean of 15 and standard deviation of 20.

Schedule Resolver

As described above, the computational method may implement a Monte Carlo simulation when operating in a Monte Carlo mode. In each iteration of the Monte Carlo simulation, the instantiation module generates instantiated values of the planning variables including (a) the random variables in each schedule of the global project and (b) the random variables associated with inter-schedule dependencies.

The schedule resolver resolves events dates within each schedule based on the instantiated values of the random variables. Resolution of event dates may proceed forward in time from project start date (or alternatively, backwards in time from a project end date). Furthermore, date resolution respects (1) the user-defined constraints on temporal ordering (of wells and facilities) and inter-schedule dependencies, and (2) system-defined global constraints such as the constraint that production from (or injection to) a well cannot start before the facility with which it is connected has finished establishment (or a certain phase of establishment). Date resolution also respects any common start dates specified by the user such as common production start date or common injection start date. Event dates include dates such as schedule start and end dates, well drilling start and end dates, well completion start and end dates, well production (or injection) dates, facility establishment start and end dates, and so on. The set of schedules generated in each iteration of the Monte Carlo simulation may be interpreted as an instantiation of a random global project schedule.

If a schedule's start date depends on one or more other schedules, the schedule's start date is calculated from the resolved event date(s) of the other schedule(s) and the instantiated dependency delay time(s). If the schedule is not dependent on another schedule, the schedule start date may be set equal to a user-specified date or calculated based on an instantiated delay from project start date.

For each well associated with a schedule, the drilling process start and end dates, the perforation start and end dates, the completion start and end dates, and the production (or injection) start date may be calculated based on the resolved schedule start date, the user-specified well ordering, and instantiated random variables such as instantiated drilling time, instantiated completion time, instantiated post-drilling delay. For each facility associated with a schedule, the facility establishment process start and end dates may be calculated based on the resolved schedule start date, any user-specified ordering of facilities, and instantiated random variables such as instantiated facility establishment time. Dates associated with wells and facilities are ordered based on the orderings given (or selected) by the user for that schedule. Production start dates for a well do not precede the establishment end date of the facility to which the well is connected. The production start date for each well may be set equal to the latest of the well's completion end date and the establishment end date of the associated facility (or facilities).

The schedule resolver respects the following rules when the schedules are instantiated in each iteration of the Monte Carlo simulation:
(a) user-specified dependencies between schedules (such as schedule start dependencies and production start dependencies) are not violated;
(b) user-specified constraints (such as well and facility ordering and mode selections) within a schedule are not violated;
(c) wells are not allowed to produce or inject before their associated facility has been established;
(d) wells are not allowed to start production or injection before the common production or injection start dates, if these have been specified.

The schedule resolver may translate data from the instantiated schedules of the global project for subsequent processing by the reservoir flow simulator and the economic computation engine. The resolved production or injection start dates for all wells of all schedules may be ordered in increasing date order and appended to the input data set $D_F$ for the reservoir flow simulator. For each well, the resolved values of the drilling start and end dates, the perforation start and end dates and the completion start and end dates may be appended to the input data set $D_E$ for the economic computation engine. For each scheduled facility, the resolved values of the facility establishment start and end dates may be appended to the input data set $D_E$ for the economic computation engine.

The schedule generator may enable the association of production (or injection) constraints for the wells with the production (or injection) start dates. The constraints may have been specified elsewhere (e.g., by the asset planning tool). Examples of constraints are maximum water production, minimum well flow pressure, and maximum gas-to-oil ratio. The schedule resolver may append these constraints to the input data set $D_F$ for the reservoir flow simulator. The reservoir flow simulator may use these constraints to realistically mimic field conditions.

Some of the wells and facilities specified by the user may represent existing (physical) wells and facilities. For example, there may be existing production wells which the user may want to shutin and then change a completion or perforation; or there may be existing facilities from which the user may want to schedule the drilling of new wells.

In some embodiments, the schedule generator may provide a graphical interface which allows the user to graphically define a system of schedules and time constraints between schedules by selecting nodes and creating links between the nodes. The nodes may correspond to events in time (such as schedule start and end dates, well drilling start and end dates, well completion start and end dates, well production or injection dates, facility establishment start and end dates and so on), and the links may represent schedules or time delays between schedules.

Figure 9:
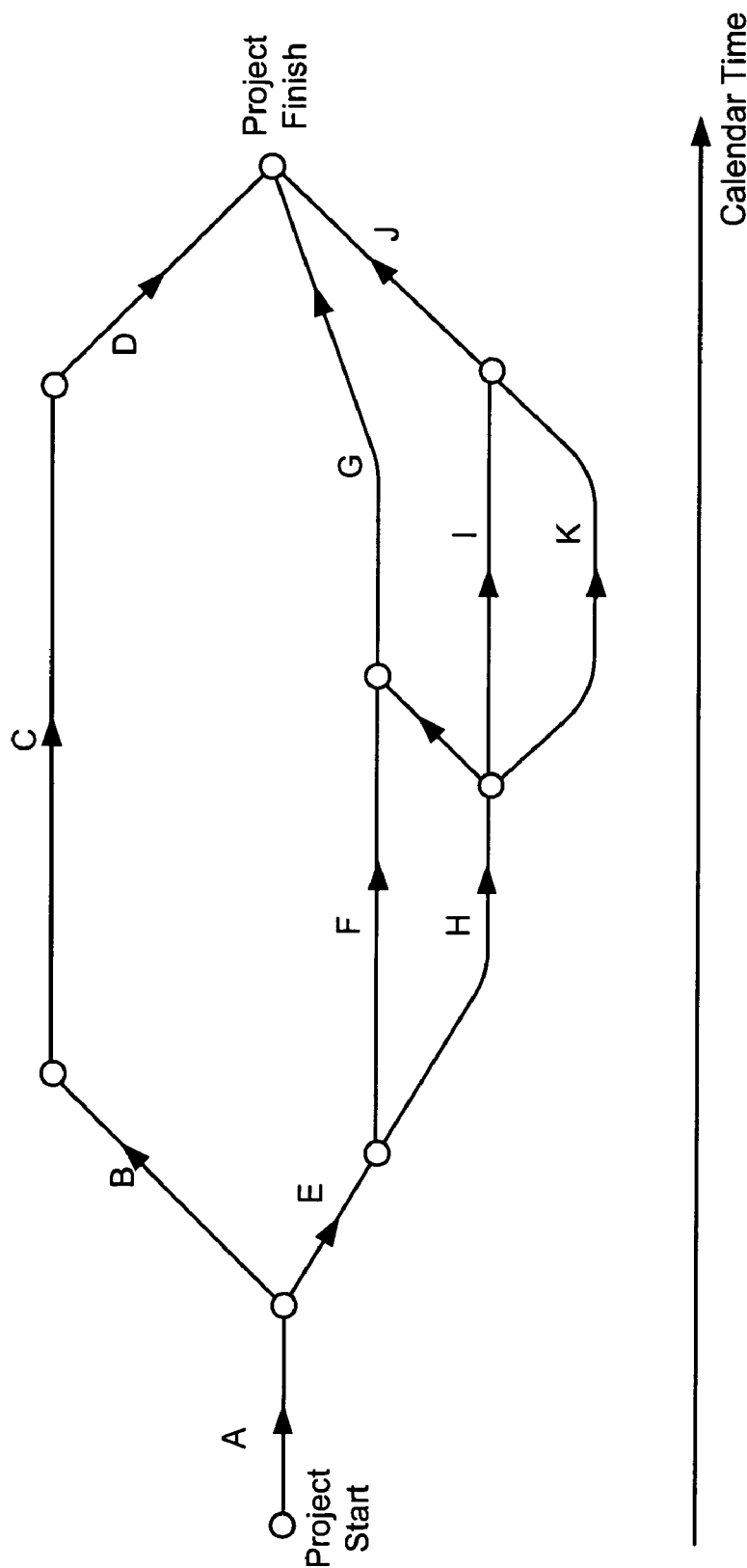
FIG. 9 illustrates a graphical method for illustrating the topology of the global schedule in terms of its component schedules and inter-schedule delays.

The user may construct the global schedule by defining schedules and their interdependencies via the schedule assigner and schedule generator. Thus, the global schedule may have an arbitrary topology. FIG. 9 illustrates a global schedule including links A through K. Each link may represent a schedule or a time delay. Observe that a plurality of schedules may run concurrently or in parallel.

The schedule manager, schedule assigner, schedule generator and schedule resolver have been described above in the context of a Monte Carlo simulation (i.e., a Monte Carlo mode of execution of the computational method) where the planning variables are instantiated in a random fashion. However, it is noted that these software components operate equally effectively in the non-random modes (e.g., the discrete combinations mode and the sensitivity analysis mode) of execution of the computational method, where the planning variables are instantiated non-randomly.

Figure 10:
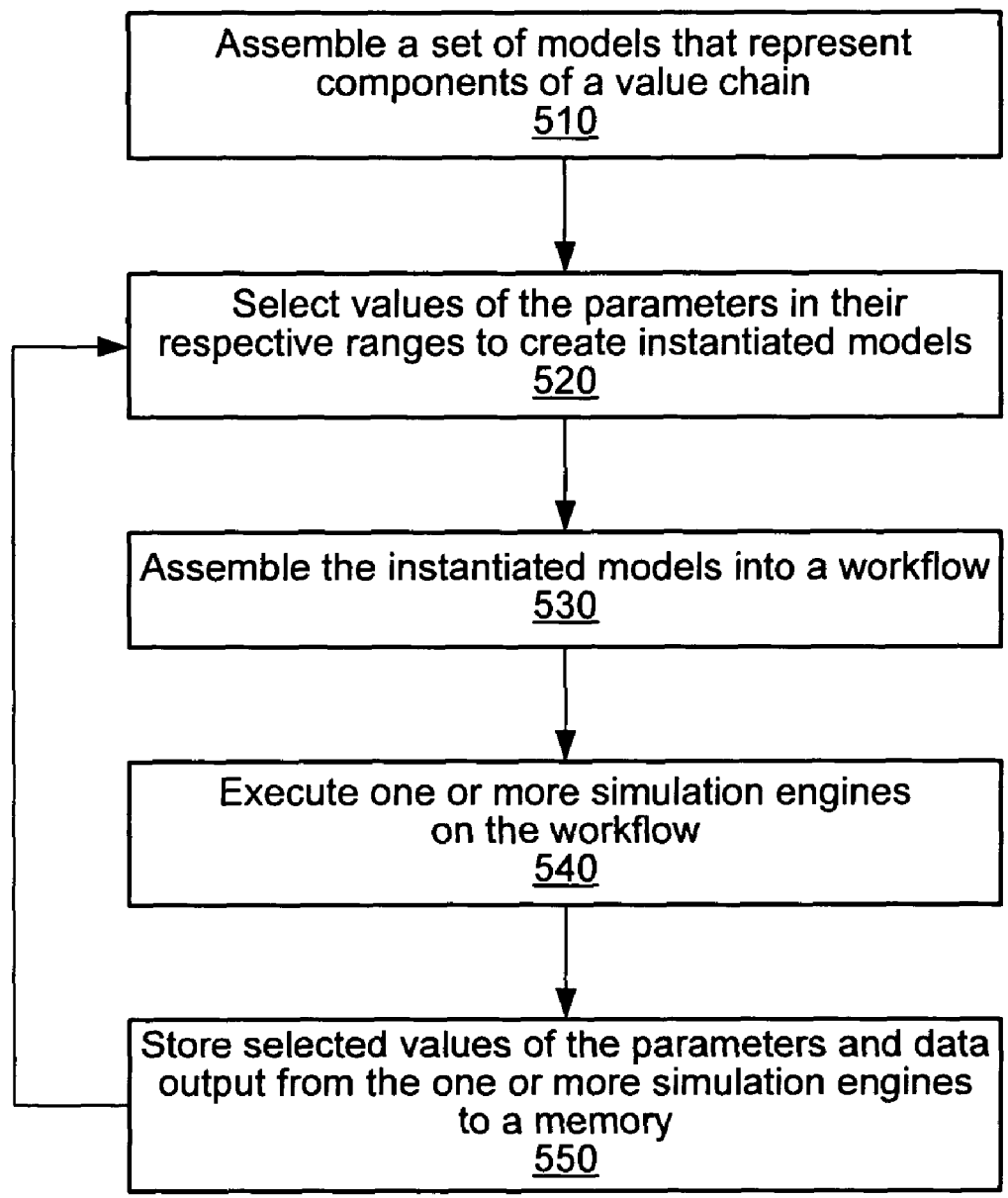
FIG. 10 illustrates one embodiment of a method for simulating the effects of uncertainty in planning variables.

In one set of embodiments, a method for simulating the effects of uncertainty in planning variables may be organized as suggested in FIG. 10. In step 510, a processor may assemble a set of models that represent components of a value chain. Each of the models of the set may include one or more planning variables. Each of the planning variables may vary within a corresponding user-defined range (e.g., a interval of the real line, or a discrete set of values).

In step 520, the processor may select (i.e., instantiate) values of the planning variables in their respective ranges to create instantiated models.

In step 530, the processor may assemble the instantiated models into a workflow. A workflow is a set of one or more data structures that are formatted for access by one or more simulation engines. For example, the input data sets $D_E$ and $D_F$ described above form a workflow.

In step 540, the processor may execute one or more simulation engines on the workflow. The simulation engines may include a reservoir flow simulator and/or an economic computation engine.

In step 550, the processor may store the selected values of the planning variables and data output from the one or more simulation engines to a memory.

Steps 520 through 550 may be repeated a number of times until a termination condition is achieved. In a Monte Carlo mode of operation, the processor may repeat steps 520 through 550 a user-specified number of times. (The user may specify an number of iterations during a preliminary setup phase.) In a discrete combinations mode of operation, the processor may repeat steps 520 through 550 until all possible combinations of values of the planning variables in their respective ranges have been exhausted. In a sensitivity analysis mode of operation, the processor may repeat steps 520 through 550 so as to scan each planning variable $X^J$ through the corresponding range, one at a time, while maintaining all other planning variables at user-defined nominal values.

In one embodiment, the processor may use an experimental design algorithm to generate combinations of values of the planning variables in each repetition (i.e., iteration) of steps 520 through 550.

Step 520, i.e., the process of selecting of values of the planning variables, may include computing quantiles of one or more user-specified probability distributions so that the repetition of steps 520 through 550 enacts a Monte Carlo simulation. The user may specify probability distributions for planning variables in various forms. For example, the user may specify a probability distribution for a planning variable by selecting a PDF from a list of standard PDF, and entering PDF characterizing parameters (such as mean and standard deviation) to specify a probability distribution. As another example, the user may specify a probability distribution for a planning variable by entering a finite set of values attainable by the planning variable and corresponding set of probability values (or positive numeric values which may be normalized to probability values). As yet another example, the user may specify a mixed distribution as a linear combination of both continuous (PDF-based) and discrete distributions.

In one set of embodiments, step 520 includes choosing a value for a planning variable in a user-specified quantile range associated with a corresponding user-specified probability distribution, e.g., a quantile range of the form of the form $[Q_A, Q_B]$, where A and B are integers between zero and 100 inclusive.

In some embodiments (or operating modes), step 520 may include computing quantiles of the user-specified probability distributions so that said repeating enacts a Monte Carlo simulation with Latin Hypercube sampling.

The method of FIG. 10 may be implemented on a computer system including a processor (or, a set of one or more processors), memory, input devices and output devices. The memory may store program instruction executable by the processor. The processor may implement the method of FIG. 10 by reading program instructions from the memory and executing the program instructions.

Case Management

As described above, the case generator may provide an interface through which the user may assemble a case from the set of models registered with the model manager and characterize the uncertainty associated with each planning variable. (Some planning variables may be embedded within the models. For example, planning variables may be used to describe parameters within the models. Other planning variables may represent choices from corresponding sets of models. These later planning variables have models as their realizations, and may be included in the case, but not in any one of the models.)

Furthermore, a run constraints manager may allow the user to specify execution setup information (for a particular case, or alternatively, independent of any particular case) in anticipation of an execution of the computational method. The execution setup information may include an execution mode selection (e.g., a selection of one of Monte Carlo mode, discrete combinations mode, or sensitivity analysis mode) and constraints on the values attainable by the planning variables. For example, the user may constrain a first planning variable so that it is allowed to take only its $Q_{25}$, $Q_{50}$ and $Q_{75}$ values during execution, constrain a second planning variable so that it is allowed to take only its $Q_{20}$, $Q_{40}$, $Q_{60}$ and $Q_{80}$ values, and so on.

As another example, the user may constrain all the planning variables associated with a first model (or group of models) of the value chain so that they are allowed to take values only in their respective value sets of the form $\{Q_{33}, Q_{66}\}$, constrain all the planning variables associated with a second model (or group of models) of the value chain so that they take values only in their respective value sets of the form $\{Q_{25}, Q_{50}, Q_{75}\}$, and so on. Note that each planning variable in the first model (or group of models) may have a probability distribution. Thus, while these planning variables may be constrained to take values only in respective value sets of the form $\{Q_{33}, Q_{66}\}$, the value sets may be numerically different due to the different probability distributions. The same comment applies to the parameters of the other models (or groups of models).

The execution setup information may also include a number of iterations that the computational method is to perform.

The run constraints manager may create an execution data set containing the execution setup information. After having specified the execution setup information, the user may invoke execution of the computational method based on a particular case and the execution setup information. In each iteration of the iteration loop, the computational method generates an iteration data set including instantiated values of the planning variables, outputs of the reservoir flow simulator (e.g., oil and gas production per well and per time interval), and outputs of the economic computation engine (e.g., net revenue per time interval). The data manager may append each of the iteration data sets to the execution data set.

Prior to execution of the computational method, an execution data set contains only the execution setup information and is said to be unpopulated. After execution, the execution data set contains the collection of iteration data sets in addition to the execution setup information, and thus, is said to be populated.

A user (or set of users) may perform multiple "experiments" on a case by repeatedly (a) specifying execution setup information and (b) executing the computational method on the case with respect to the execution setup information. For example, the user may invoke execution of the computational method on the case three times: once with each planning variable fixed at its $Q_{50}$ value; once with 1000 iterations in Monte Carlo mode; once in discrete combinations mode with each parameter constrained to values in a corresponding set. Thus, the case may accrue multiple execution data sets over time. Each execution data set includes at least the corresponding execution setup information and may also include iteration data sets depending on whether execution with respect to the execution setup information has commenced.

Figure 11:
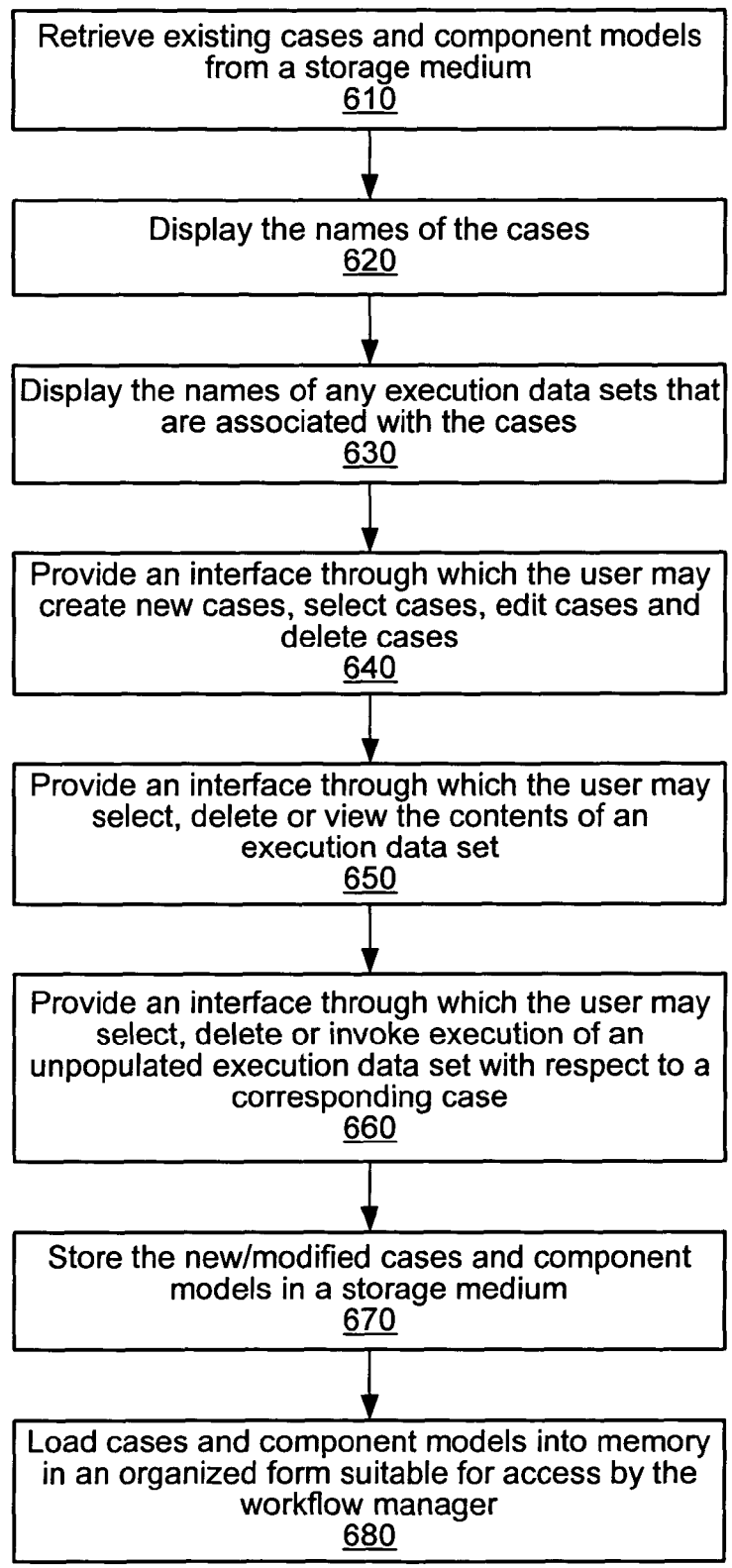
FIG. 11 illustrates one set of embodiments of case manager that manages a plurality of cases and their corresponding execution data sets.

Furthermore, over a period of time, a user (or a set of users) may assemble a plurality of cases. Therefore, the supporting programs of the decision management system may include a case manager that manages the plurality of cases and their corresponding execution data sets. In one set of embodiments, the case manager may perform the functions illustrated in FIG. 11. The case manager may:

(a) retrieve existing cases and component models (of the value chain) included in the existing cases from a storage medium (e.g., from nonvolatile memory 504) as indicated in step 610;

(b) display the names of the cases and their component models to the user as indicated in step 620;

(c) display the names of any execution data sets (whether populated or unpopulated) that are associated with the cases as indicated in step 630;

(d) provide a user interface through which the user may create new cases, select cases, copy cases, edit cases and delete cases as indicated in step 640;

(e) provide a user interface through which the user may select, delete or view the contents of any populated execution data set as indicated in step 650;

(f) provide a user interface through which the user may select, delete or invoke execution of any unpopulated execution data set as indicated in step 660;

(g) store new or modified cases and corresponding component models in a storage medium (e.g., the same storage medium as in (a)) as indicated in step 670; and (h) load cases and their component models into memory (e.g., RAM 506) in an organized form suitable for access by the workflow manager as indicated in step 680.

In response to user inputs commanding the deletion of a case (or a set of one or more component models within a case), the case manager may remove the case (or the set of one or more component models) from the storage medium.

In one set of embodiments, a method for managing cases may include at least (a), (b), (d) and (g). In one subset of this set of embodiments, the method for managing cases may further include (h). In another subset of this set of embodiments, the method for managing cases may further include one or more of the functions (c), (e), (f) and (h).

In another set of embodiments, a method for managing executions of a simulation (e.g., executions of the computational method) may include at least (c), (e) and (f). In one subset of this set of embodiments, the method may further include (h). In another subset of this set of embodiments, the method may further include one or more of the functions (a), (b), (d) and (g). In one embodiment, the method may include the functions (a)-(g).

As used herein, the phrase "invoke execution of an unpopulated execution data set W" means "invoke execution of the computational method on a particular case C based on the execution setup information of the unpopulated execution data set W".

In one set of embodiments, the unpopulated execution data sets may be interpreted as "peers" to the cases, i.e., an unpopulated execution data set may be created independent of any case, and may be executed with respect to one or more cases. For example, an unpopulated execution data set whose execution setup information specifies only "Monte Carlo mode" and "$N_{MAX}=40$ iterations" could be executed against any number of cases.

Figure 12:
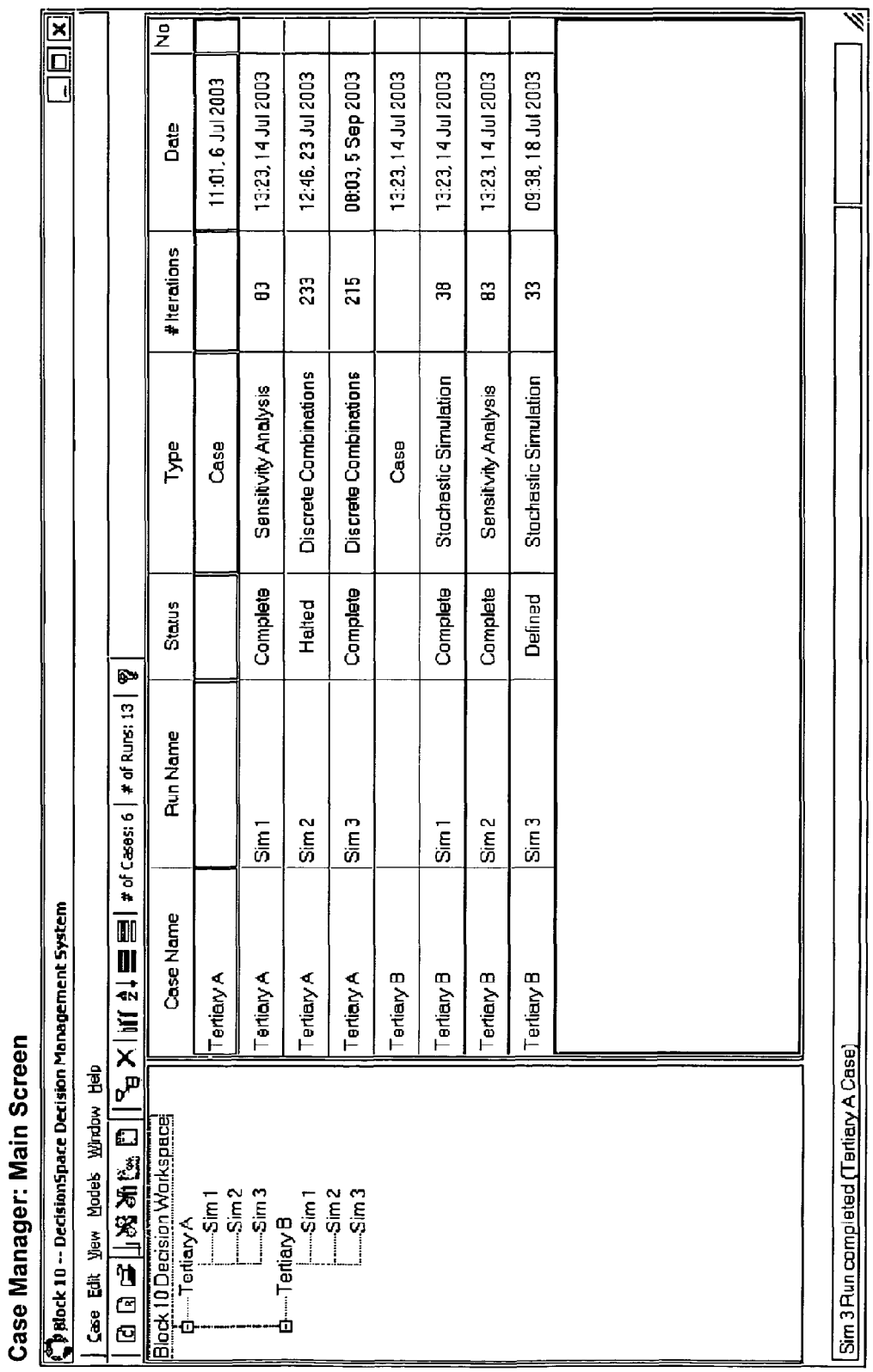
FIG. 12 illustrates one embodiment of a main screen of the case manager.

FIG. 12 illustrates one embodiment of a main screen of the case manager. The term "run name" is used synonymous with the term "execution data file name". Two cases "Tertiary A" and "Tertiary B" are illustrated. Each case has three defined execution data files. The status entry of an execution data file indicates whether it is defined (and not yet executed), halted (after having been partially executed), or completed.

Figure 13:
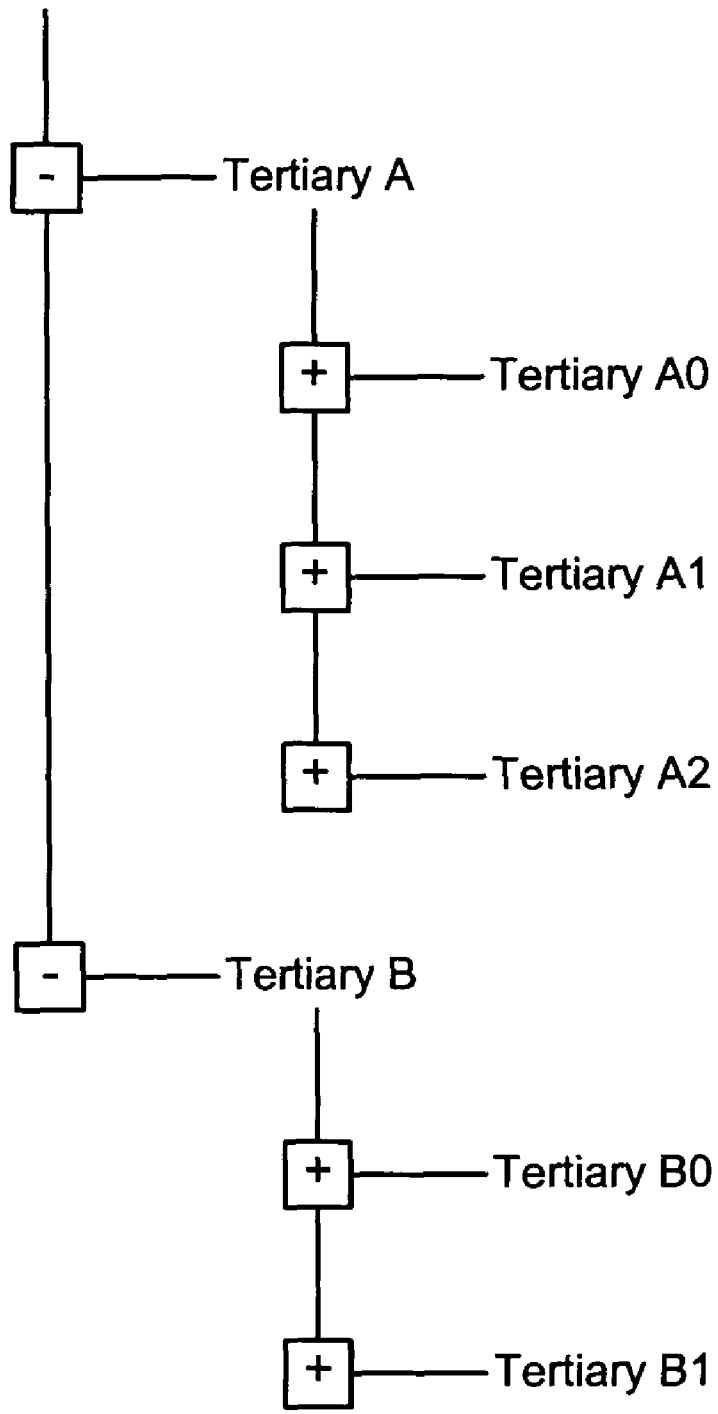
FIG. 13 illustrates one embodiment of a graphical interface illustrating such parent-child relationships between cases.

The case manager may also report any relationships between the cases. For example, case X may be identical to case Y except for a subset of values (or models) which differ. The user may have created case Y by copying case X and modifying the subset of values (or models) in the copy. The case manager may provide a graphical interface that visually indicates that case Y is a child case of case X. The case manager may report the subset of values (or models) that differ between case X and case Y in response to a request asserted by the user (e.g., in response to the user clicking on an icon representing case Y or on a link connecting case X to case Y). FIG. 13 illustrates one embodiment of a graphical interface illustrating such parent-child relationships between cases. A decision workspace is shown with two cases denoted "Tertiary A" and "Tertiary B". Tertiary A has three children cases denote Tertiary A0, A1 and A2. Tertiary B has two children cases denoted Tertiary B0 and B1.

The inventive principles described herein for making and using a decision management system are broadly applicable for the planning of commercial and/or industrial projects in any of various problem domains, not merely to the domain of petroleum reservoir exploitation.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method comprising:
a computer system receiving user input selecting a plurality of simulation engines corresponding to a value chain;
the computer system assembling in a memory a set of models that represent components of the value chain, wherein each of the models of said set of models includes one or more variables, where each of said one or more variables is defined on a corresponding range, wherein at least one of the models of said set of models is a high-resolution geocellular reservoir model;
the computer system selecting values of the variables in their respective ranges to create instantiated models, wherein said selecting values of the variables in their respective ranges is performed according to an operational mode, wherein the operational mode is selected by a user from a set of operational modes including a Monte Carlo mode, a discrete combinations mode and a sensitivity analysis mode;
the computer system assembling the instantiated models into a workflow;
the computer system executing the simulation engines on the workflow to generate data output, wherein the simulation engines include one or more physics-based flow simulators for simulating reservoirs, wells and surface-pipeline hydraulics, wherein the simulation engines also include an economic computation engine; and
the computer system storing the selected values of the variables and the data output from the one or more simulation engines to a memory;
the computer system repeatedly performing a set of operations including said selecting, said assembling the instantiated models, said executing and said storing.

2. The method of claim 1, wherein said selecting of values of the variables includes computing quantiles of one or more user-specified probability distributions.

3. The method of claim 1, wherein said selecting of values of the variables includes choosing a value in a user-specified quantile range $[Q_A, Q_B]$ based on a probability distribution specified by a user for a first one of the variables, wherein A and B are integers between zero and 100 inclusive.

4. A computer-implemented method comprising:
a computer system receiving input specifying a user's selection of a plurality of simulation engines associated with a value chain;
the computer system assembling in a memory a set of models that represent components of the value chain, wherein each of the models of said set includes one or more variables, wherein at least one of the models of the set of models is a high-resolution geocellular reservoir model;
the computer system instantiating the variables of each model to determine instantiated models, wherein said instantiating the variables includes instantiating a value of a first one of the variables, wherein said instantiating the variables of each model is performed according to an operational mode, wherein the operational mode is selected by a user from a set of operational modes including a Monte Carlo mode, a discrete combinations mode and a sensitivity analysis mode;
the computer system assembling the instantiated models into a workflow;
the computer system executing the simulation engines on the workflow to generate data output, wherein the simulation engines include one or more physics-based flow simulators for simulating reservoirs, wells and surface-pipeline hydraulics, wherein the simulation engines also include an economic computation engine; and
the computer system storing the data output from the simulation engines to a memory;
the computer system repeatedly performing a set of operations including said instantiating, said assembling the instantiated models, said executing and said storing.

5. A computer-implemented method comprising:
a computer system computing an instantiated value of each variable in a set of variables, wherein said computing the instantiated value of each variable is performed according to an operational mode, wherein the operational mode is selected by a user from a set of operational modes including a Monte Carlo mode, a discrete combinations mode and a sensitivity analysis mode;
the computer system selecting a first geocellular reservoir model from a collection of high-resolution geocellular reservoir models based on a first subset of the instantiated values;
the computer system resolving uncertain dates for events in one or more schedules using a second subset of the instantiated values in order to determine resolved event dates in the one or more schedules;
the computer system executing a simulation engine on an input data set including the first geocellular reservoir model and the resolved event dates, wherein the simulation engine includes one or more physics-based flow simulators for simulating reservoirs, wells and surface-pipeline hydraulics, wherein the simulation engine also includes an economic simulator; and
the computer system capturing data generated by the simulation engine in response to said execution to a storage medium;
the computer system repeatedly performing a set of operations, wherein the set of operations includes said computing, said selecting, said resolving, said executing and said capturing.

6. The method of claim 5, wherein the input data set also includes: a model of reservoir physical characteristics; a well location model; a well plan model; a model that represents a schedule for the drilling of one or more wells; a model that represents a schedule for production from the one or more wells; a capital investment expense model; an operating expense model; and a fiscal regime model.

7. A computer system comprising:
a memory storing program instructions;
a processor configured to read the program instructions from the memory, wherein the program instructions are executable by the processor to:
assemble a set of models, wherein each of the models of said set of models includes one or more variables, where each of said one or more variables is defined on a corresponding range, wherein at least one of the models of said set is a high-resolution geocellular reservoir model;
select values of the variables in their respective ranges to create instantiated models, wherein said selecting values of the variables in their respective ranges is performed according to an operational mode, wherein the operational mode is selected by a user from a set of operational modes including a Monte Carlo mode, a discrete combinations mode and a sensitivity analysis mode;

execute a well-perforator program on one or more well plans included in the instantiated models in order to determine perforation locations for the one or more well plans;

assemble the instantiated models and the perforation locations into a workflow; and execute a plurality of simulation engines on the workflow, wherein the simulation engines include one or more physics-based flow simulators for simulating reservoirs, wells and surface-pipeline hydraulics, wherein the simulation engines also include an economic computation engine;

repeatedly perform a set of operations, wherein the set of operations includes said selecting, said executing the well-perforator program, said assembling the instantiated models and the perforation locations, and said executing the simulation engines.

8. The computer system of claim 7, wherein the program instructions are executable by the processor to:

store data output from the simulation engines to the memory.

9. A computer-readable memory medium storing program instructions, wherein the program instructions are configured to direct one or more computers to:

assemble a set of models, wherein each of the models of said set includes one or more variables, where each of said one or more variables varies in a corresponding range, wherein at least one of the models of said set is a high-resolution geocellular reservoir model;

select values of the variables in their respective ranges to create instantiated models, wherein said selecting values of the variables in their respective ranges is performed according to an operational mode, wherein the operational mode is selected by a user from a set of operational modes including a Monte Carlo mode, a discrete combinations mode and a sensitivity analysis mode;

execute a well-perforator program on one or more well plans included in the instantiated models in order to determine perforation locations for the one or more well plans;

assemble the instantiated models and the perforation locations into a workflow;

execute a plurality of simulation engines on the workflow, wherein the simulation engines include one or more physics-based flow simulators for simulating reservoirs, wells and surface-pipeline hydraulics, wherein the simulation engines also include an economic computation engine;

repeatedly perform a set of operations, wherein the set of operations includes said selecting, said executing the well-perforator program, said assembling the instantiated models and perforation locations, and said executing the simulation engines.

10. The computer-readable memory medium of claim 9, wherein the program instructions are further configured to direct the one or more computers to:

automatically store data output from the simulation engines to a memory.

11. A computer-implemented method comprising:

a computer system performing setup operations to assemble a case comprising a set of planning variables and models, wherein at least one of said models is a high-resolution geocellular reservoir model;

the computer system executing a calculation loop a plurality of times, wherein each iteration of the calculation loop includes:

automatically generating instantiations of the planning variables to determine instantiated models from the models, wherein said automatically generating instantiations of the planning variables is performed according to an operational mode, wherein the operational mode is selected by a user from a set of operational modes including a Monte Carlo mode, a discrete combinations mode and a sensitivity analysis mode;

automatically executing well-perforator software on one or more well plans included in the instantiated models in order to determine perforation locations associated with the one or more well plans;

automatically executing a plurality of simulation engines on the instantiated models and the perforation locations, wherein the simulation engines include one or more physics-based flow simulators for simulating reservoirs, wells and surface-pipeline hydraulics, wherein the simulation engines also include an economic computation engine; and automatically capturing the instantiated planning variables and output data from the simulation engines onto a storage medium.

12. The method of claim 11, wherein said capturing comprises storing the instantiated planning variables and the simulation output data onto the storage medium in a relational database format.

13. The method of claim 11, wherein said generating instantiations of the planning variables includes:

calculating a set of random numbers; and calculating quantile values using the random numbers and user-defined probability distributions associated with the planning variables.

14. The method of claim 11, wherein said performing setup operations includes receiving user input specifying execution qualifying data corresponding to the case, wherein the execution qualifying data includes a set of attainable values for each planning variable.

15. The method of claim 14, wherein the execution qualifying data includes a number of iterations of the calculation loop.

16. The method of claim 14, wherein the execution qualifying data include data characterizing probability distributions for one or more of the planning variables.

17. A computer-implemented method comprising:

a computer system receiving user input characterizing probability distributions for planning variables associated with a set of models, wherein the set of models includes one or more high-resolution geocellular reservoir models;

the computer system generating instantiated values of the planning variables, wherein said generating instantiated values of the planning variables is performed according to an operational mode, wherein the operational mode is selected by a user from a set of operational modes including a Monte Carlo mode, a discrete combinations mode and a sensitivity analysis mode;

the computer system assembling one or more input data sets for a plurality of simulation engines from the set of models and the instantiated values, wherein said assembling includes resolving uncertain event dates in one or more schedules included in the set of models based on a first subset of the instantiated values;

the computer system executing a well perforator program based on a second subset of the set of models and a second subset of the instantiated values.

the computer system executing the simulation engines on the one or more input data sets, wherein the simulation engines include one or more physics-based flow simulators for simulating reservoirs, wells and surface-pipeline hydraulics, wherein the simulation engines also include an economic computation engine;

the computer system storing the instantiated values of the planning variables and data output from the simulation engines to a storage medium; and the computer system repeatedly performing a set of operations, wherein the set of operations includes said generating, said assembling, said executing a well perforator, said executing the simulation engines, and said storing until a termination condition is achieved.

18. The method of claim 17 further comprising: executing a reservoir model scaling engine to scale said one or more high-resolution geocellular reservoir models of said set of models to a lower resolution.

19. A computer-implemented method comprising:
(a) a computer system receiving user input characterizing a set of planning variables associated with a set of models;
(b) the computer system generating instantiated values of the planning variables, wherein said generating instantiated values of the planning variables is performed according to an operational mode, wherein the operational mode is selected by a user from a set of operational modes including a Monte Carlo mode, a discrete combinations mode and a sensitivity analysis mode;
(c) the computer system assembling a first input data set using a first subset of the instantiated values and a first subset of the set of models, and assembling a second input data set using a second subset of the instantiated values and a second subset of the set of models, wherein the first subset of the set of models includes a high-resolution geocellular reservoir model;
(d) the computer system executing a well-perforator program to determine well perforation locations for wells in the first input data set, and appending the well perforation locations to the first input data set;
(e) the computer system determining instantiated schedules using a third subset of the instantiated values and a third subset of the models, and appending the instantiated schedules to the first input data set and the second input data set;
(f) the computer system executing one or more physics-based flow simulators on the first input data set to generate flow data for oil, gas and water and appending the flow data to the second input data set, wherein the one or more physics-based flow simulators are configured to simulate reservoirs, wells and surface-pipeline hydraulics;
(g) the computer system executing an economic computation engine on the second input data set to generate economic output data;
(h) the computer system storing the instantiated values of the planning variables, the flow data and the economic output data to a storage medium in a relational database format; and
(i) the computer system repeating a set of operations until a termination condition is achieved, wherein the set of operations includes (b), (c), (d), (e), (f), (g) and (h).

20. The computer-implemented method of claim 1, wherein the data output is useable to estimate an economic value of one or more of the reservoirs, wells and surface-pipeline hydraulics.

21. The method of claim 1, wherein said selecting of values of the variables is based on a Latin Hypercube sampling of the variables.

22. The method of claim 1, wherein said repeatedly performing covers all possible combinations of values of the variables in their respective ranges.

23. The method of claim 1, wherein said repeatedly performing uses an experimental design algorithm to generate combinations of variable values in each iteration of said repeating.

24. The method of claim 5, wherein said computing is based on a Latin Hypercube sampling of the variables.

25. The method of claim 1, wherein the set of models includes a tax model, a royalty model, a capital expenditure model and an operating expenditure model.

26. The method of claim 25, wherein the set of models includes a facility model, wherein the facility model specifies a set of objects including wells, platforms, pipelines and processing plants, wherein the facility model also specifies interconnections between objects of said set of objects, wherein the facility model specifies constraints on production rates and pressure for each of the objects in said set of objects.

27. The method of claim 1, wherein the set of models includes a hierarchical tree of models, wherein at least one of the instantiated models is a leaf of the hierarchical tree, wherein two or more of said selected values specify a path from a root of the hierarchical tree to the leaf of the hierarchical tree.

* * * * *